(12) United States Patent
Gebelein

(10) Patent No.: US 7,532,394 B2
(45) Date of Patent: May 12, 2009

(54) METHODS AND APPARATUS PROVIDING IMPROVED VISUAL CAPABILITIES OF OPTICAL INSTRUMENTS

(75) Inventor: Rolin Gebelein, Santa Cruz, CA (US)

(73) Assignee: Gebelein Family Trust, Santa Cruz, CA (US)

( * ) Notice: Subject to any disclaimer, the term of this patent is extended or adjusted under 35 U.S.C. 154(b) by 291 days.

(21) Appl. No.: 11/379,839

(22) Filed: Apr. 24, 2006

(65) Prior Publication Data

US 2007/0081238 A1    Apr. 12, 2007

Related U.S. Application Data

(60) Provisional application No. 60/724,506, filed on Oct. 7, 2005, provisional application No. 60/729,552, filed on Oct. 22, 2005, provisional application No. 60/753,661, filed on Dec. 23, 2005.

(51) Int. Cl.
*G02B 23/00*    (2006.01)

(52) U.S. Cl. .................................................... 359/407
(58) Field of Classification Search ................. 359/399, 359/407, 480
See application file for complete search history.

(56) References Cited

U.S. PATENT DOCUMENTS 3,528,724 A * 9/1970 Bertin .................... 359/413
4,601,552 A * 7/1986 Jessmore ................. 359/413

FOREIGN PATENT DOCUMENTS

SU            1647254        *  5/1991

* cited by examiner

*Primary Examiner*—Alessandro Amari
(74) *Attorney, Agent, or Firm*—Donald R. Boys; Central Coast Patent Agency, Inc.

(57) ABSTRACT

A color-filtering device for enhancing color from a binocular view includes a first variable color filter element a second variable color filter element: and a mechanical assembly for communication of axial rotation to the first and second filter elements.

6 Claims, 19 Drawing Sheets

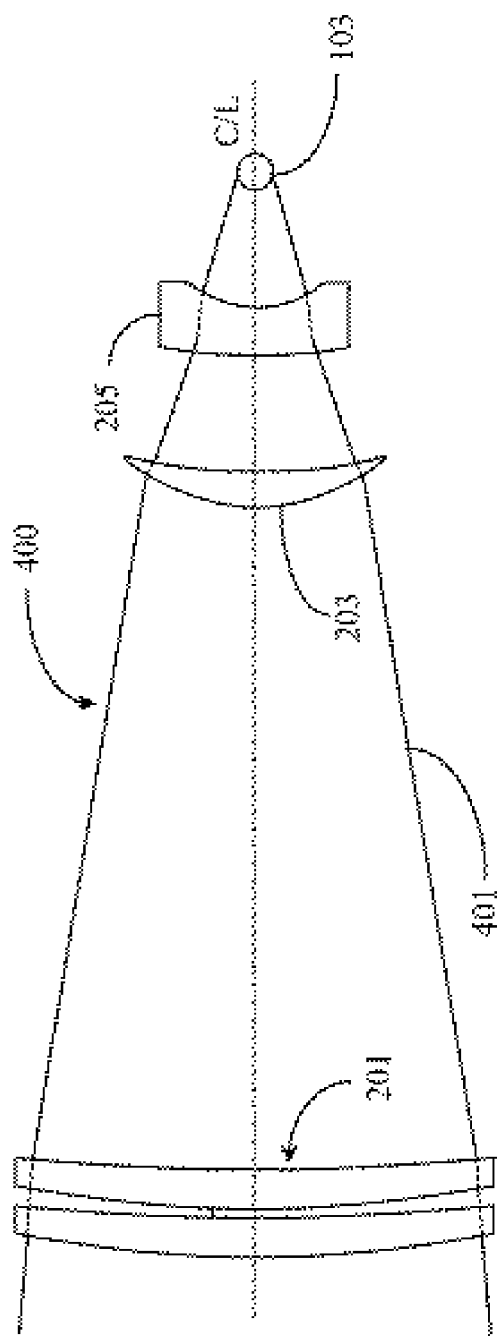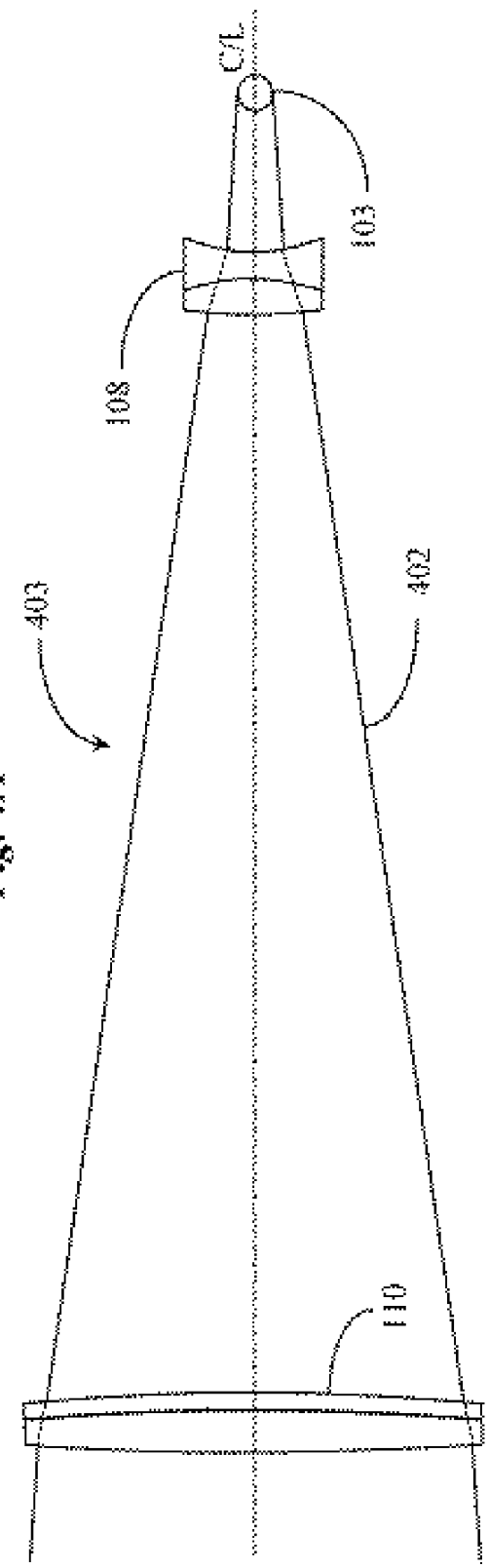
Fig. 4A
Fig. 4B

| LENS | Front Radius | Back Radius | CT | Space | Matl. | DIA |
|---|---|---|---|---|---|---|
| Objective (1) | 4.62 CX | 10.01 CC | 0.45 | 0.05 | Acrylic | 2.40 |
| Objective (2) | 3.79 CX | 4.63 CC | 0.35 | 4.07 | Acrylic | 2.40 |
| Fld Lens (3) | 0.82 CX | 1.81 CC | 0.30 | 0.33 | BS-Crown | 1.35 |
| Eye Lens (4) | 15.79 CX | 0.65 CC | 0.13 | ——— | Polycarb | 1.00 |

601

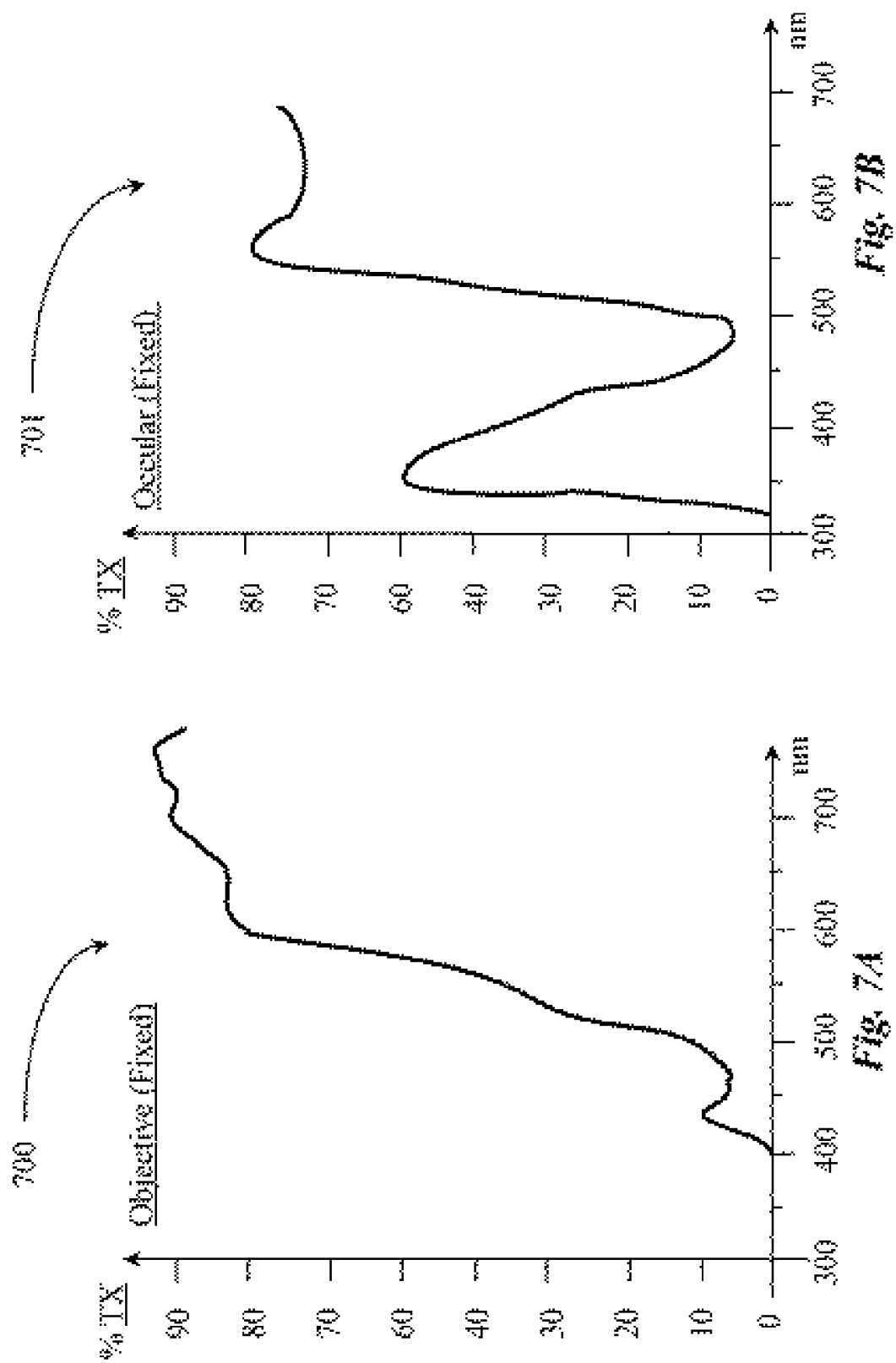

METHODS AND APPARATUS PROVIDING IMPROVED VISUAL CAPABILITIES OF OPTICAL INSTRUMENTS

CROSS-REFERENCE TO RELATED APPLICATIONS

The present invention claims priority to a U.S. provisional patent application Nos. 60/724,506 filed on Oct. 7, 2005, 60/729,552 filed on Oct. 22, 2005, and to U.S. provisional patent application No. 60/753,661 filed on Dec. 23, 2005. The above referenced applications are included herein in their entirety in this specification at least by reference.

BACKGROUND OF THE INVENTION

1. Field of the Invention

The present invention is in the field of optical instruments including binocular field glasses and colorized glasses such as sunglasses or the like. The invention pertains particularly to methods and apparatus providing improved visual capabilities of optical instruments.

2. Discussion of the State of the Art

Classical Galilean binoculars have the advantage over modern prism binoculars of producing an erect virtual image for a user and are not equipped with prisms or other devices. The entrance pupil of the eye must coincide with the optical axis of the Galilean telescope or binocular for successful viewing. The construction of Galilean binoculars and the implementation of optics therein enable a field of view which may be rather limited.

A common limitation of standard Galilean binoculars and one that is not necessarily limited to Galilean binoculars is that it may be very difficult to see clearly through them when using them to view certain action-intense sporting events. This is due in part to the small exit pupil size and to specific eye relief limitations. One with skill in the art of binocular viewing may appreciate these limitations by simply holding a binocular up to a source of light and away from the user's face. The small circular exit pupils may then be observed as de-magnified images of the front objectives within the eye lenses of Galilean binoculars, or illuminated in mid air at a short fixed distance behind the eye lenses of modern prism binoculars. That short fixed distance is termed the binocular "eye relief" in the art and may vary somewhat among different binocular designs. To use these binocular systems successfully, it is necessary to place both pupils of ones eyes directly in line with these small exit pupils and exactly at the precise fixed distance behind the eye lenses with modern prism binoculars. If this were not done, the user would not see anything. Logically then, maintaining that position with respect to keeping the pupils at the exit pupil locations is very difficult during fast moving sports activities. Wearing of eyeglasses or sunglasses may also severely limit successful viewing.

Typically, the objective lenses of Galilean binoculars are positive achromatic doublets each comprised of a positive element made of a crown glass or acrylic plastic material and also a negative element to correct color aberrations made of a flint glass or polycarbonate type of plastic material. The positive element is very expensive to manufacture using plastic molding techniques especially in large diameter short focal lengths. Visual limitations occur because of a fact that the thin peripheral edges of the positive element cool more quickly than the thick centers of the lens and so the surface "slumps" or becomes distorted and therefore less able to produce sharp contrast and clear imaging.

Still other fixed conditions associated with using a Galilean or a more modern binocular system may be construed to be limitations for which a solution may be provided. For example, it is generally known that one must continually refocus a typical binocular system to compensate for the varying object distance created by the moving players of the sporting event. Also known is that the binocular system must be adjusted to a proper eye separation distance between a user's eyes. Still other limitations may exist such as lack of color contrast imaging enhancements and chromatic imaging adjustments which are typically not available in an affordable and practical manner to most standard binocular systems.

Binoculars are useful in magnifying the appearance of distant objects and often utilize anti-reflection or other coatings to reduce "glare" that may occur under certain use conditions. However, the color contrast of images is generally always fixed by the lens properties and the results thereof may be far from optimum for viewing substantial detail of images under a variety of conditions.

Colored or tinted glasses, like sunglasses, for example, are used to diminish light intensity for comfort's sake, and are also worn for appearance sake. Sunglasses are often provided with colored lenses for appearance. Colored lenses may also be used to provide enhanced contrast in objects viewed such as with ordinary "driving glasses" or "shooters' glasses" where orange or yellow tinted lenses are employed to improve visual contrast by reducing the blue end of the color spectrum. However, these colored glasses provide only limited vision enhancement because the contrast is limited by the fixed color of the lenses employed.

Therefore, what is clearly needed in the art are methods and apparatus for improving the visual capabilities of optical instruments including binocular systems and, in some cases, colored glasses or sunglasses. Such improvements and methods of implementation and use would provide more reliable and entertaining viewing through such optical instruments without requiring significant alteration or expense related to existing designs and configurations.

SUMMARY OF THE INVENTION

A binocular optics system is provided and includes a pair of light converging objective lens assemblies, a pair of light converging field lenses, and a pair of light diverging ocular lenses. In a preferred embodiment, the objective lens assemblies each comprise two meniscus lenses stacked together and having a substantially same space between them in each assembly. In this embodiment, the field lenses are meniscus lenses disposed behind the objective lens assemblies. In this embodiment, the binocular optics system requires no prisms, focus mechanisms, or eye separation adjustment mechanisms. In a preferred embodiment, the meniscus lenses of an objective lens assembly have differing convex radii and differing concave radii, the front lenses in each assembly identical in dimension and the back lenses in each assembly identical in dimension.

In one embodiment, the binocular optics system described above includes a color absorption filter disposed in a fixed position in front of the pair of light converging objective lens assemblies. In another embodiment, the binocular optics system includes a pair of color absorption filters disposed in a fixed position between the field lenses and the ocular lenses. In one aspect the binocular optics system without fixed color absorption filters includes a color-filtering device disposed at an axially rotable position behind the objective lens assemblies. In another aspect, the binocular optics system includes a fixed color absorption filter in front of the objective assemblies and also includes a color-filtering device disposed at an axially rotable position behind the objective lens assemblies.

According to another aspect of the present invention, a color-filtering device is provided for selectively filtering color of a binocular view. The device includes an elongate shaft, a turn wheel centrally mounted to one or both ends of the elongate shaft, and two filter elements mounted centrally over the elongate shaft, the elements fixed to the shaft at substantially spaced apart positions, the elements aligned with each other and in substantially the same plane. In one embodiment, the filter elements are substrates coated on one or both filter sides with one or more layers of interference film, the coated substrates varying in color transmission according to angle of incident light passing through the substrates. In this aspect, the filter elements are one of rectangular in profile or annular in profile.

According to another aspect of the present invention, a binocular optics system is provided wherein the system includes a pair of light converging objective lenses, a pair of prism elements, a pair of light diverging ocular lenses, and a mechanically controllable color-filtering device. In a preferred embodiment the color filtering device is disposed behind the pair of prism elements and in front of the ocular lenses, the point of mechanical control of the device accessible at a central shaft supporting the left and right-side optics.

In a preferred embodiment, the color-filtering device controls rotation of two color filter elements disposed laterally on elongate shafts one element each presented in front of the ocular lenses. In a variation of this embodiment, the filter elements are annular substrates, each coated with one or more multi-layer interference layers of film. In another variation of this embodiment, the filter elements are annular cells further defined as rings enclosing multiple layers of color absorption film. In both variations of the preferred embodiment, the filter elements vary in color transmission according to the angle of incident light hitting the filter surface.

According to yet another aspect of the present invention, a color-filtering device for enhancing color from a binocular view is provided. The device includes a first variable color filter element, a second variable color filter element, and a mechanical assembly for communication of axial rotation to the first and second filter elements.

In one embodiment, the filter elements are substrates coated on one or both filter sides with one or more layers of color-controlling film, the coated substrates varying in color transmission according to angle of light passing through the substrates. In another embodiment, the filter elements are annular cells further defined as rings enclosing multiple layers of color controlling film, the cells varying in color transmission according to angle of incident light hitting the substrates.

In one embodiment, the mechanical assembly includes a wheel having gear teeth disposed in a circular pattern around the periphery of one edge of the wheel, and an arm having gear teeth arrayed in a radial pattern on one end of the arm, wherein the teeth of the arm engage the teeth of the wheel to translate axial rotation through the assembly and through connecting shafts to the filter elements. In another embodiment the mechanical assembly includes, an elongate rod mounted to the first filter element having a spline formed thereon, and an elongate tube mounted to the second filter element having a key slot formed therein, wherein the key slot fits over the spline such that the rod and tube together form a slidable axle operated by a thumb lever connected to the tube to cause axial rotation to the filter elements. In still another embodiment, the mechanical assembly includes, a first rod connected at one end to the first filter element and at the other end to a drive pin seated in a helical groove placed in a rotation wheel, a second rod connected at one end to the second filter element, and a scissor arm pinned at one end to the first rod and at the other end to the second rod, wherein rotation of the rotation wheel displaces the drive pin laterally in the groove causing axial rotation of the first and second filter elements.

According to still a further aspect of the invention, a method is provided for enabling selective variance of color spectrum viewable through an optics element. The method includes the acts (a) applying one or more layers of color-interference coating to a substrate or a lens element, the film applied producing a property of color spectrum variance according to the angle that light from a light source passes through the substrate or lens element, (b) presenting the coated substrate or lens element between the light source and the optics element at an orientation substantially perpendicular to the line of sight through the optics element, and (c) rotating or tilting the coated substrate or lens element to a selected angle away from perpendicular.

In one aspect, of the method the optics element is an ocular lens of a binocular system. In another aspect, in act (b), the presentation involves a lens element of the form of a sunglass lens and the optics element is a user's eye. In this aspect, in act (c), the sunglass lens is tilted about a hinge connected to a frame enclosing the lens. In a variance of the first aspect described above, in act (c), the coated substrate or lens element is mounted on a shaft that is rotated off perpendicular.

BRIEF DESCRIPTION OF THE DRAWING FIGURES

FIG. 4A is a block diagram illustrating a lens arrangement analogous to the lens arrangement of FIG. 2A in side view.

FIG. 4B is a block diagram illustrating a lens arrangement 403 analogous to the lens arrangement of FIG. 1A in side view.

FIG. 7A is a graph illustrating color absorption of the objective filter of FIG. 5A.

FIG. 7B is a graph illustrating color transmission of a fixed multi-layer substrate filter placed between the field lens and eye lens of FIG. 5A according to an embodiment of the present invention.

DETAILED DESCRIPTION

Figure 1A:
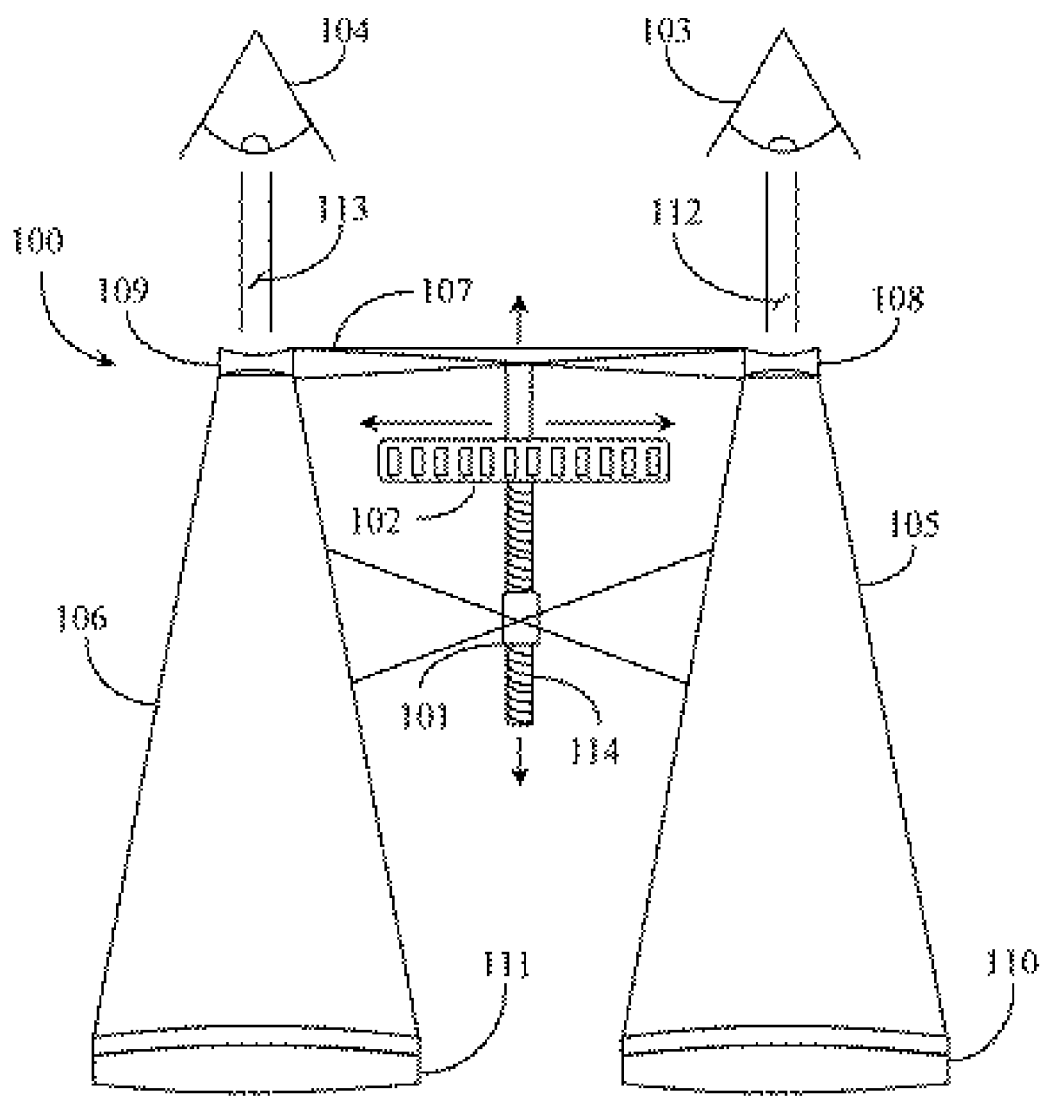
FIG. 1A is a block diagram illustrating component arrangement of a Galilean binocular system according to prior art.
Figure 1B:
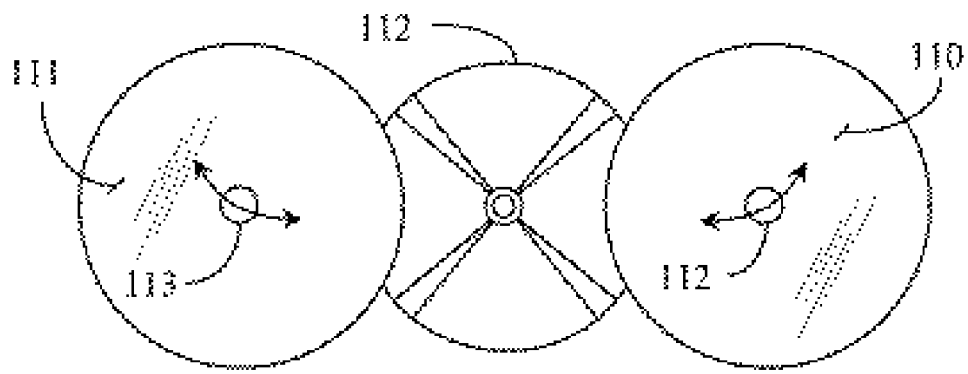
FIG. 1B is a front view of the binocular system of FIG. 1A.

FIG. 1A is a block diagram illustrating component arrangement of a Galilean binocular system 100 according to prior art. System 100 illustrates a typical Galilean construction for a binocular. FIG. 1B is a front view of the binocular system of FIG. 1A.

Referring now to FIG. 1A, a binocular barrel 105 and a binocular barrel 106 are illustrated as being hinged together and affixed in a substantially parallel relationship to one another. A hinge 101 is illustrated in this example and functions as a center hinge, about which barrels 105 and 106 may be rotated in a limited fashion to provide some adjustment for eye separation distance in order to accommodate a user's eyes. A user's eyes are illustrated in this example as eye 103 and eye 104.

System 100 includes a center shaft 114 that supports at least one hinge 101 including fixed arms attached at the barrels for supporting and controlling those barrels. Shaft 114 is threaded about a portion thereof for accommodating a forward and rearward motion-focusing wheel 102. Focusing wheel 102 controls forward and rearward movement of a pair of eye lenses illustrated herein as ocular lenses 108 and 109. A bridging mechanism or eye lens carrier 107 supports the lenses in a substantially parallel relationship and supports translation of forward and rearward movement of lenses 108 and 109 along the line of sight axis, such translation controlled manually by rotation of wheel 102 according to the associated directional arrows illustrated. Other types of focus systems are known in the art, however Galilean systems typically focus by manual turning of wheel 102 to advance or retreat lens pair (108, 109) to bring an object into focus.

System 100 includes a pair of objective lenses including objective 110 and objective 111. In this example, objective lenses 110 and 111 are achromatic doublets known in the art and typical of Galilean construction. Not withstanding the obvious focus function and eye separation adjustment capabilities of system 100, system 100 exhibits a very small exit pupil within the eye lens. This is illustrated herein as an exit stream of light 112 and an exit stream of light 113. The descriptor "small exit pupil" is meant to infer that the width of the light streams from system 100 to user eyes 103 and 104 is very small, perhaps just covering the diameter of a user's pupils, or less. Therefore, in order to obtain a comfortable and clear view of an object magnified by system 100 it is necessary that eye separation adjustments and focusing adjustments be made manually by the user.

Referring now to FIG. 1B, objectives 110 and 111 may be rotated inward, shortening eye separation, or outward increasing eye separation. Exit pupils 112 and 113 are illustrated from the perspective of the objective lens. Double arc-shaped arrows illustrate the rotation path of the barrels about hinge 101. The Galilean design does not produce "exit pupils" at definite "eye relief" distance and thus the eyes may be placed at various distances behind the instrument. However, due to relatively small diameter exit beams 112 and 113, the image of the field of view will rapidly become smaller as the eye is placed further behind the ocular lens.

Figure 2A:
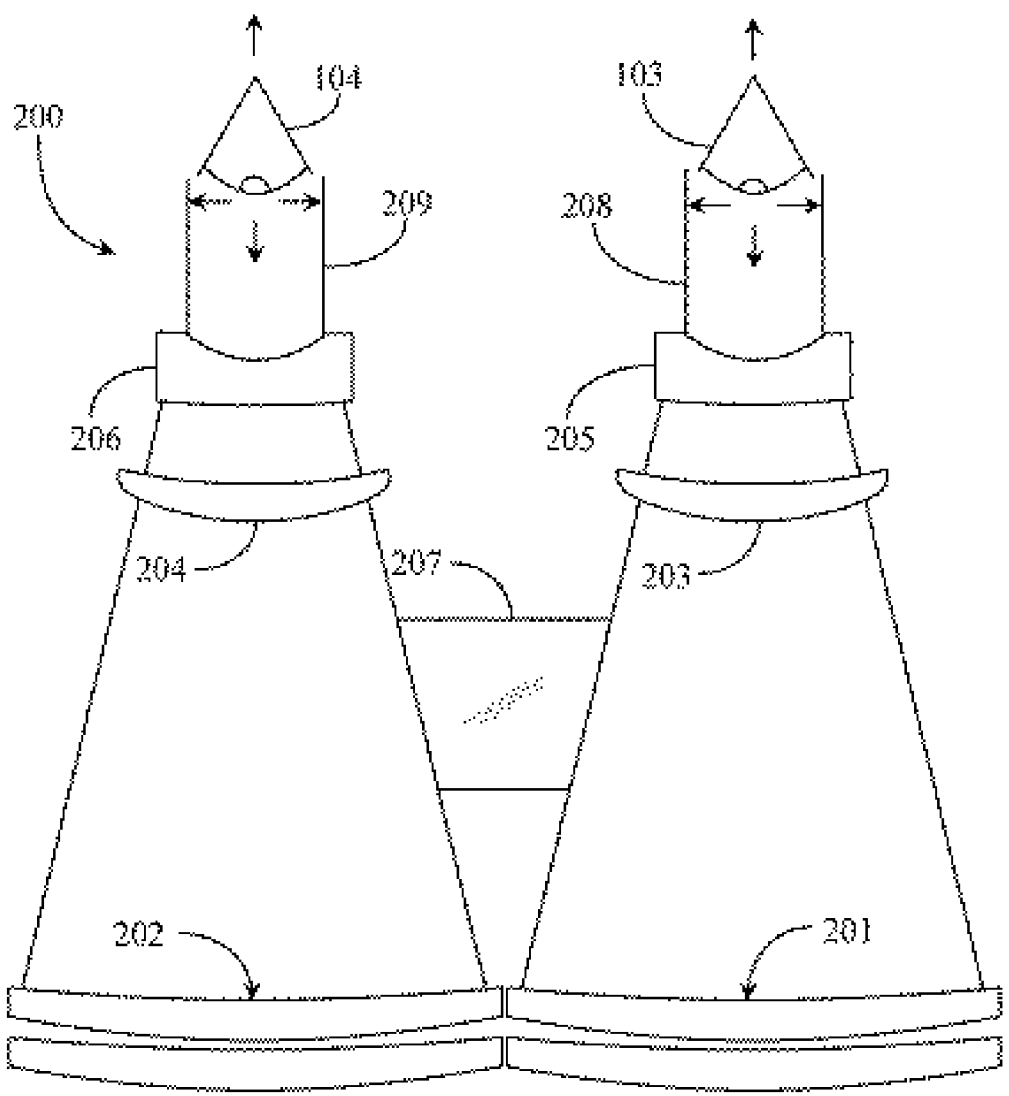
FIG. 2A is a block diagram illustrating component arrangement of a Galilean binocular system adapted for optimal visual capability with minimal control requirements according to an embodiment of the present invention.
Figure 2B:
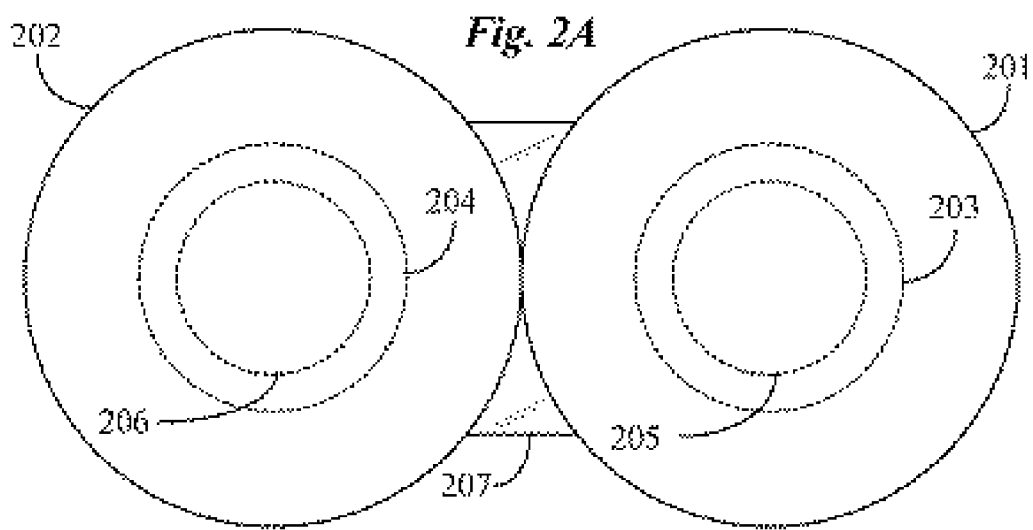
FIG. 2B is a block diagram illustrating a front view of the system of FIG. 2A.

FIG. 2A is a block diagram illustrating component arrangement of a Galilean binocular system 200 adapted for optimal visual capability with minimal control requirements according to an embodiment of the present invention. FIG. 2B is a block diagram illustrating a front view of system 200 of FIG. 2A. Referring now to FIG. 2A, system 200 is adapted according to an embodiment of the present invention to optimize the field of view such that manual eye separation and focus adjustment controls are not required. In a preferred embodiment, the optimization is created through a specific optics arrangement of unique optics lenses.

System 200 includes unique objective lenses formed as objective lens pairs of a lens type termed a meniscus lens. A meniscus lens is a lens that assumes a crescent shape having one concave surface and one convex surface opposite the concave surface. In a preferred embodiment, an objective pair 201 is provided corresponding to a user's left eye 103 and an objective pair 202 corresponding with a user's right eye is provided. Each meniscus pair comprises 2 each "positive" meniscus lenses that when stacked as an objective pair, promote a very short focal length. In a preferred embodiment, the lenses are stacked concentrically with the convex side of each lens in the pair facing away from the user. Each meniscus lens may be, in a preferred embodiment, molded of acrylic or other suitable optical plastics. The lenses in pairs 201 and 202 are held relatively thin in molding relative to overall diameter of those lenses. The lenses in pairs 201 and 202 may be as large as 2.5 inches in diameter in one preferred embodiment, however they are approximately 2.400 inches in diameter in this example. The typical human eye separation is about 2.5 inches so a 1.25-inch eye separation half-distance emerging from the center of the nose bridge corresponds substantially to the center of each lens pair.

In a preferred embodiment, each lens in objective pair 201 and objective pair 202 has a minimal center-to edge thickness variation thereby lending to an economical molding process and supporting lightweight construction. The provision of objective pairs 201 and 202 in system 200 obfuscates the need for typical achromatic doublets described further above with respect to FIG. 1A and FIG. 1B. The exact thickness (measured at center) of a meniscus lens of pair 201 or pair 202 may vary slightly, but a preferred thickness for the present example is approximately 0.45 inches for the top lens in each pair and 0.35 inches for the bottom lens in each pair. Also in a preferred embodiment, the lenses in a pair are spaced apart at a preferred gap of approximately 0.050 inches as measured from the back surface center point of the top lens in a pair to the front surface center point of the adjacent lens in the pair.

Binocular system 200 further includes a unique field lens, two of which are provided in this embodiment and which are strategically located in a preferred arrangement behind each of the objective pairs 201 and 202. Field lens 203 is provided in conjunction with the left side of a binocular system in this optics arrangement. Field lens 204 is provided in conjunction with the right side of a binocular system in this optics arrangement. The field of view of the specific arrangement is illustrated in this example as a conical solid boundary extending from objective pairs 201 and 202, extending through field lenses 203 and 204 and into the ocular lenses of the system. The ocular lenses, also termed "eye lenses" are illustrated herein as an ocular or eye lens 205 associated with the left-side optics and an ocular or eye lens 206 associated with the right-side optics of system 200.

Field lenses 203 and 204 are also meniscus lenses as described above with respect to objective pairs 201 and 202. In a preferred embodiment field lenses 203 and 204 are positioned in line with and just in front of eye lenses 205 and 206 respectively. Galilean binocular systems of prior art do not contain field lenses. It is known that a field lens has been used in some standard telescopic devices that produce an internal image, however the use of field lenses in Galilean type binocular systems that produce no internal image is unique. The field lenses 203 and 204 are adapted in a preferred embodiment, to capture more light from objective pairs 201 and 202 respectively, and to direct all of that light gathered into eye lenses 205 and 206 respectively. Field lenses 203 and 204 may be manufactured of a borosilicate crown glass or other rigid lens materials.

The addition of field lenses 203 and 204 within system 200 provides a much brighter image as viewed by the user's eyes, and one that has a much better contrast than is possible with a standard Galilean binocular system. In a preferred embodiment, the diameter of field lenses 203 and 204 is approximately 1.350 inches and center thickness measures about 0.300 inches. In this example, lenses 203 and 204 are spaced about 4.070 inches from the back surface of corresponding objective pairs 201 and 202 respectively. Eye lenses 205 and 206 may be formed of a high optical index polycarbonate plastic or, in one embodiment, of flint glass material. In a polycarbonate version of lenses 205 and 206, the surface of each lens facing away from the user is slightly convex while the backside of the system is notably concave. In the flint glass version, the front surface of each lens facing away from the user may be slightly concave. Lenses 205 and 206 produce a very short focal length. Further, they are strongly negative producing much more optical magnification power than standard Galilean systems. In a preferred embodiment, lenses 205 and 206 are manufactured from a high optical index polycarbonate plastic, which enables chromatic correction.

The shape of the lenses in this example and the provision of the described lenses within system 200 enable system 200 to be fixed with respect to eye separation. This is illustrated in this example by a bridge plate 207 connecting the left and right optics of system 200, presumably via attachment between the enclosing barrels of the system. Similarly, the arrangement of the optics in system 200 obfuscates the need to focus in on an object being viewed. More particularly, the combination of unique lenses in the described arrangement produces significantly large exit beams illustrated herein as left exit beam 208 and right exit beam 209. Exit beams 208 and 209 are significantly wider than beams 112 and 113 illustrated in FIG. 1A. Accordingly, a user may vary eye placement laterally and forward and rearward to a lager extent and still receive an optimized view of an object sighted through system 200. A user may, for example, wear a pair of eyeglasses or sunglasses and still use system 200 without being required to remove his or her glasses in order to obtain a good view.

Referring now to FIG. 2B, objective pairs 201 and 202, field lenses 203 and 204, and eye lenses 205 and 206 are substantially concentric in alignment. Objective pairs 201 and 202 are positive or convergent lenses producing a short positive focal length. Field lenses 203 and 204 are also positive or convergent lenses producing a short positive focal length. Lenses 205 and 206 are strongly negative or divergent producing a very short negative focal length.

Figure 3B:
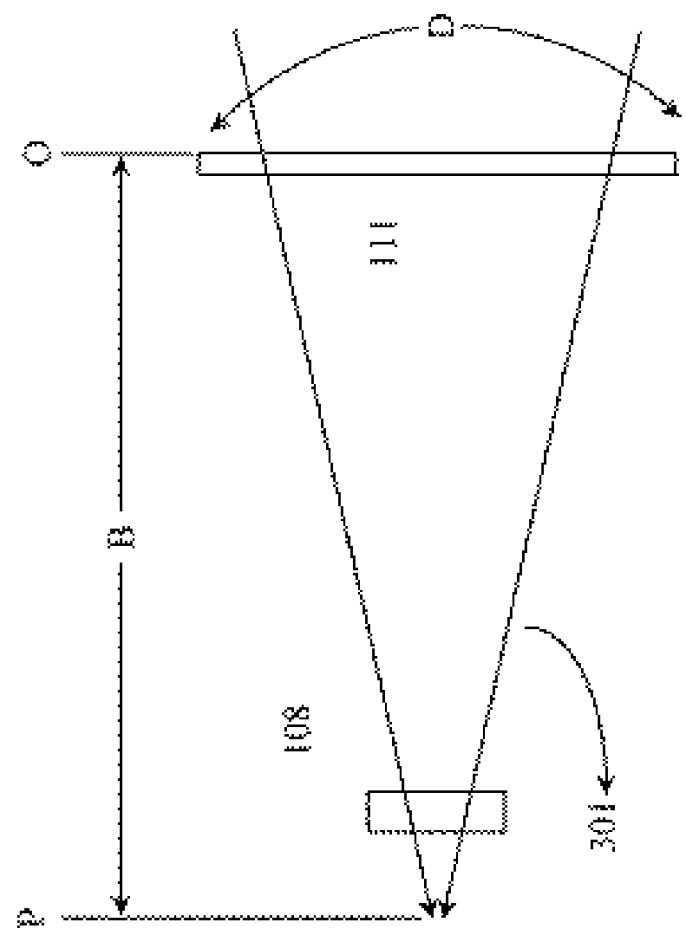
FIG. 3B is a block diagram illustrating typical lens arrangement of a Galilean system according to prior art.
Figure 3A:
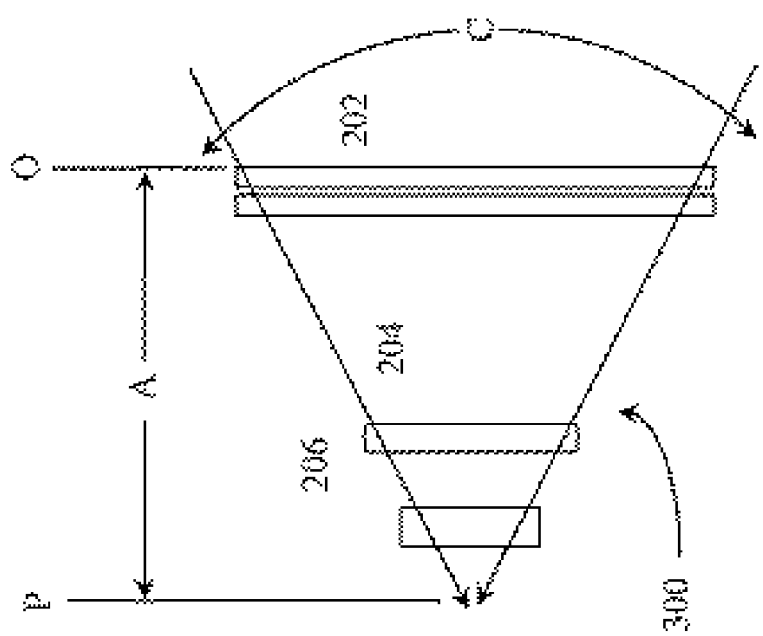
FIG. 3A is a block diagram illustrating lens arrangement according to an embodiment of the present invention.

FIG. 3A is a block diagram illustrating a lens arrangement 300 according to an embodiment of the present invention. FIG. 3B is a block diagram illustrating a typical lens arrangement 301 of a Galilean system according to prior art.

Referring now to FIG. 3A, optics arrangement 300 is provided as previously described above for a Galilean type binocular system having no prisms and therefore focusing an image only at the user's eyes. In this example, optics arrangement 300 is analogous to the right-side optics lenses previously described above with respect to FIGS. 2A and 2B. Therefore, the described lenses shall retain their same element numbers and shall not be reintroduced. Lens curvatures representing concave or convex lens surfaces are omitted from this logical view but may be assumed present as previously described. Objective pair 202 consisting of 2 positive meniscus lenses gathers light according to a wide field of view represented herein by a field angle C or the angle at which light traveling radially enters the binocular system and is captured by the objective pair.

Field lens 204 strategically located in front of eye lens 206 functions to further shorten focal length and directs maximum light into eye lens 206 to optimize image brightness and contrast. Shortening the positive focal length of the optics allows the system to be provided of a shorter overall length and enabling a more compact and lightweight system. Therefore, angle C is greater than would be provided with a standard Galilean system having a same or similar diameter objective. The choice of lightweight lens materials aids in producing a system of lighter weight. A length A illustrated in this example as a distance between the front objective surface (O) and a user's pupil (P) is significantly shortened over typical Galilean optics described in FIG. 3B.

Referring now to FIG. 3B, optics 301 is analogous to the right side optics arrangement in barrel 106 of FIG. 1A above. Achromatic doublet 111 of a same or similar diameter as meniscus pair 202 gathers light at a smaller angle D. Absence of field lens 204 results in a greater distance between the objective (o) and the pupil (P).

FIG. 4A is a block diagram illustrating a lens arrangement 400 analogous to the lens arrangement of FIG. 2A in side view. FIG. 4B is a block diagram illustrating a lens arrangement 403 analogous to the lens arrangement of FIG. 1A in side view.

Referring now to FIG. 4A, a conical light path boundary or viewing field 401 is illustrated in a preferred embodiment passing through meniscus pair 201, field lenses 203 and eye lens 205 focusing an image through pupil or eye 103. It can be seen that meniscus pair 201 and field lens 203 producing shorter focal lengths and strongly negative lens 205 in cooperation produce a wider filed of view 401 at a shorter overall system length than a standard Galilean lens arrangement having a same or similar objective diameter shown in FIG. 4B.

Referring now to FIG. 4B, achromatic doublet 110 of a same or similar diameter as meniscus pair 201 described above produces a much longer focal length resulting in a much longer system length and a smaller overall conical light path or field of view 402.

Figure 5A:
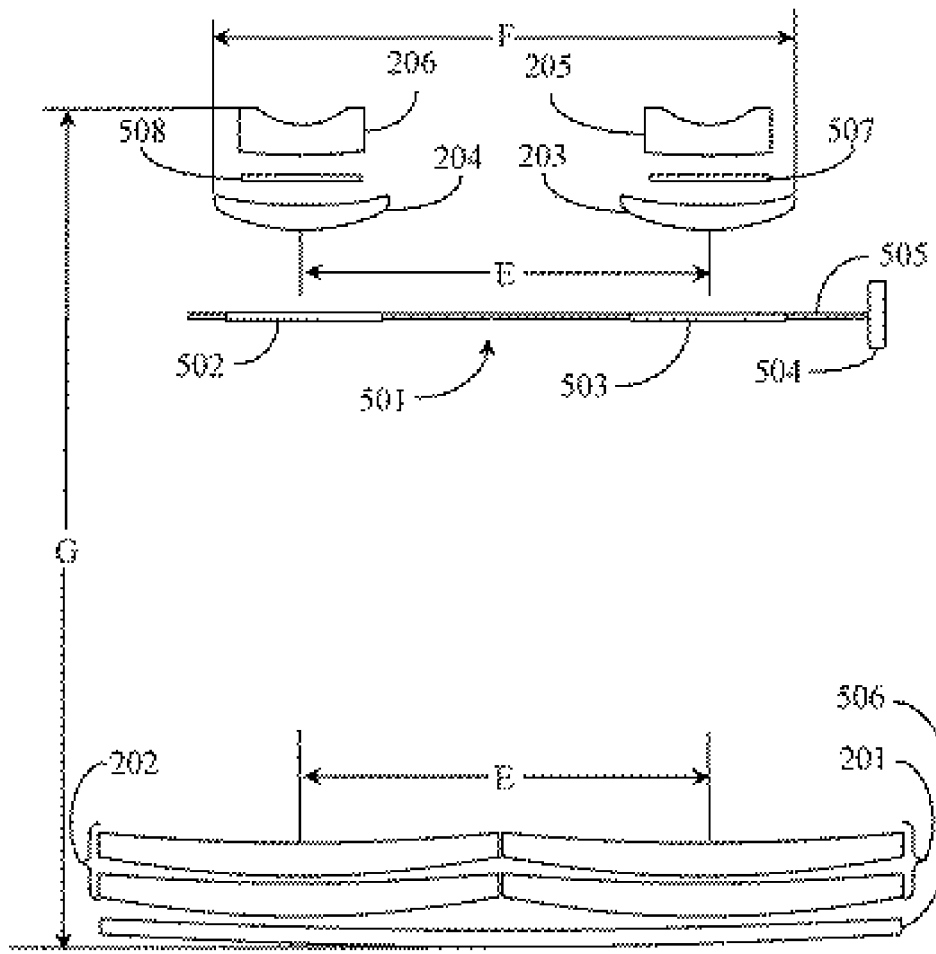
FIG. 5A is a top view of the lens arrangement of FIG. 2A enhanced with absorption and variable color filtering capabilities according to an embodiment of the present invention.
Figure 5B:
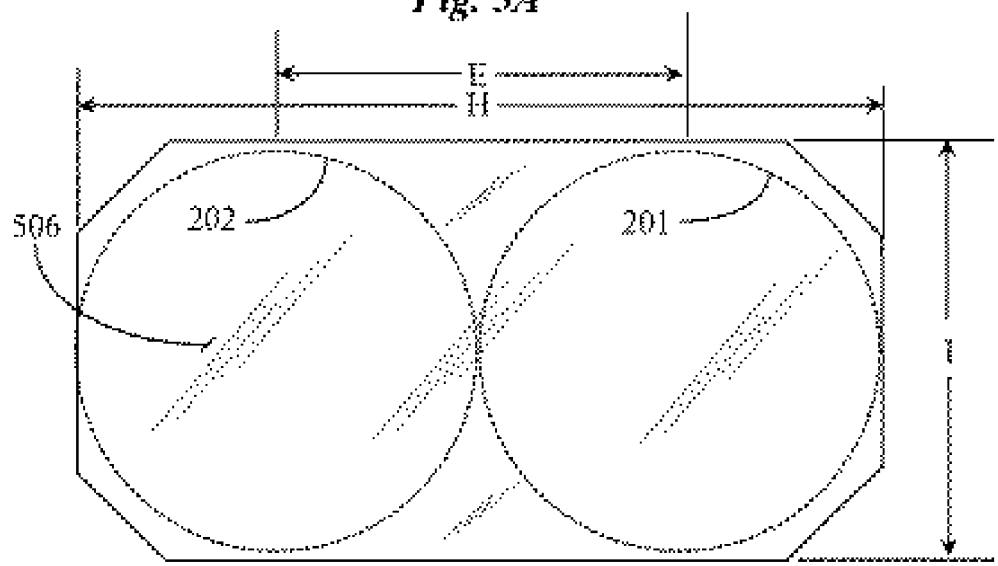
FIG. 5B is a front view of the arrangement of FIG. 5A.

FIG. 5A is a top view of the lens arrangement of FIG. 2A enhanced with absorption and variable color filtering capabilities according to an embodiment of the present invention. FIG. 5B is a front view of the arrangement of FIG. 5A.

Referring now to FIG. 5A, a color absorption filtering substrate 506 is provided to reside directly in front of meniscus pairs 201 and 202. Absorption filter 506 is adapted to filter out certain colors from light passing there through in order to enhance color contrast of an image being viewed. In this example, objective filter 506 is a fixed filter substrate that may be provided of a high-grade optical glass, plastic or similar plastic substrate. Filter 506 may be provided as a color enhancing plastic element as shown in this preferred embodiment, or as an optical multi-layered coating provided on a lens element or separate substrate. In one embodiment, filter 506 may be an absorption filter Acrolite™ 430-7 "yellow" filter, although this should not be construed as a limitation as other filters are certainly available and may be used. The human eye responds better to greens and yellows so a good initial color contrast may be obtained using a filter that filters out more of the blues. In a preferred embodiment objective filter 506 doubles as a protective element for meniscus pairs 201 and 202.

In one embodiment of the present invention a variable color contrast filtering mechanism 501 is provided and strategically implemented just in front of field lenses 203 and 204. Mechanism 501 comprises a shaft 505 to which a turn wheel 504 is mounted. Shaft 505 may be a stainless steel or aluminum shaft rotably mounted within the binocular system, wheel 504 is made accessible to a user on the outside of the binocular housing.

Shaft 505 supports two filter substrates 502 and 503 strategically mounted in a parallel relationship to each other and spaced in accordance with the centerline axis' of filed lenses 204 and 203 respectively. In this view, substrates 502 and 503 are in a perpendicular position with respect to the longitudinal or "line of sight" axis of the supporting binocular system. Substrates 503 and 502 are each coated with multiple layers of color controlling film in one embodiment. Substrates 503 and 502 may be formed of a high-grade optical glass or plastic.

In a preferred embodiment where multiple layers of color controlling film are used, the film coating on substrates 502 and 503 is angularly sensitive to varying angles of the incidence of incoming light such that if device 501 is turned away from perpendicular relevant to the line of sight, the color transmission properties of the device vary accordingly. In one embodiment, substrates 502 and 503 may instead be coated lens elements having substantially more thickness than a typical substrate.

In another embodiment of the invention fixed absorption filters may be provided between field lenses 203 and 204 and eye lenses 205 and 206. A left filter 507 is illustrated in a fixed position between lenses 203 and 205. A right filter 508 is illustrated in a fixed position between lenses 204 and 206. Filters 507 and 508 may be similar in construction material to objective filter 506. A high-grade glass or plastic is suitable. In one embodiment, Filters 507 and 508 are multi-layered color controlling substrates. Filters 507 and 508 may be used in combination with or in place of filter 506.

In this particular embodiment, the Galilean system enhanced with field lenses 203 and 204, meniscus pairs 201 and 202, and negative eye lenses 205 and 206, assumes a dimensional profile that is optimized for a sports binocular system. For example, a system length G is approximately 6 inches. Eye separation distance E is approximately 2.5 inches. A distance F measured from the distal edges of the field lenses is approximately 4.0 inches.

Referring now to FIG. 5B, the overall preferred width of the enhanced Galilean system is 5.0 inches. The overall height of the system is approximately 2.6 inches. Thus the enhancements produced by the unique lens arrangement produce a lighter and more compact system having a wider and more accessible field of view.

Figure 5C:
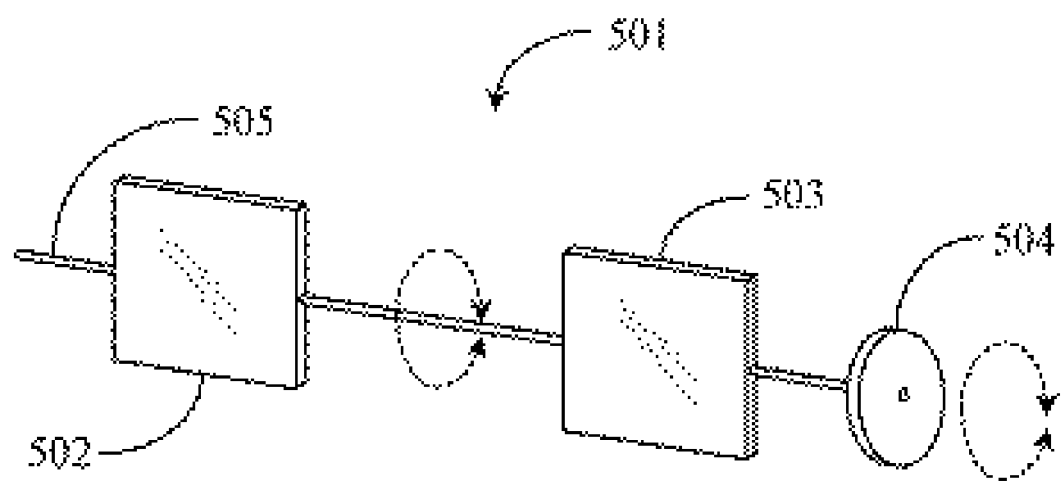
FIG. 5C is a perspective view of the variable color contrast control device of FIG. 5A.
Figure 5D:
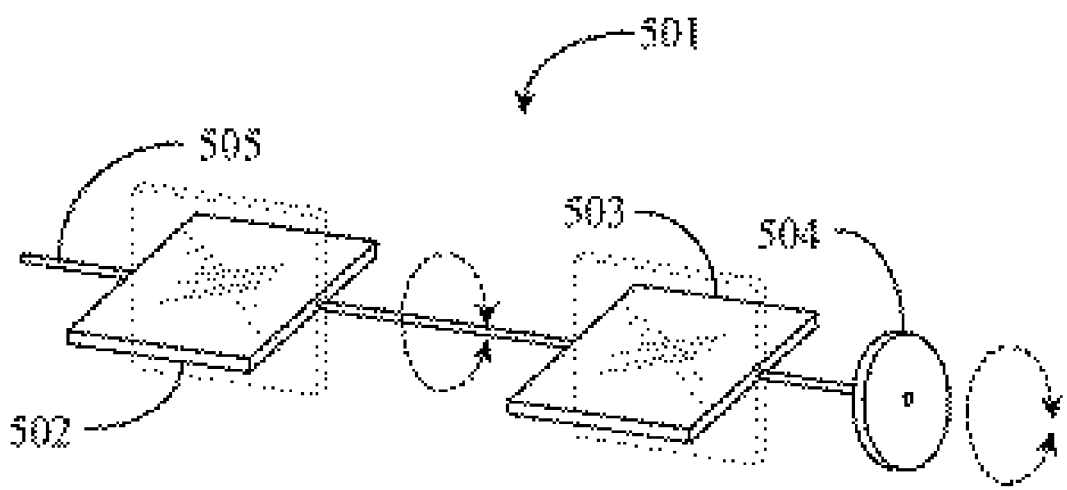
FIG. 5D is a perspective view of the device of FIG. 5A rotated approximately 22 degrees from perpendicular.

FIG. 5C is a perspective view of variable color contrast device 501 of FIG. 5A. FIG. 5D is a perspective view of device 501 rotated approximately 22 degrees from perpendicular.

Referring now to FIG. 5C, turn wheel 505 may be manipulated by a user to vary the angle from perpendicular for substrates 503 and 502 by turning shaft 505 in either a front or backwards direction as indicated by the turn arrow illustrated. When perpendicular, a set or fixed color spectrum is transmitted.

Referring now to FIG. 5D, device 501 is turned away from perpendicular to approximately 22 degrees providing a completely different color spectrum to be transmitted. The exact rate of change for color control may vary according to the film layers provided. In a preferred embodiment, wheel 504 and shaft 505 are mounted such that the rate of color change is controlled in a graduating manner by degree. The mounting of device 501 is accomplished using frictional bearings or other friction or pressure housings about shaft 505 so that the substrates remain fixed in any turned position without being freely rotable. More detail regarding the color absorption properties of filter 506 and of variable filter device 501 is provided later in this specification.

Figures 6A, 6B:
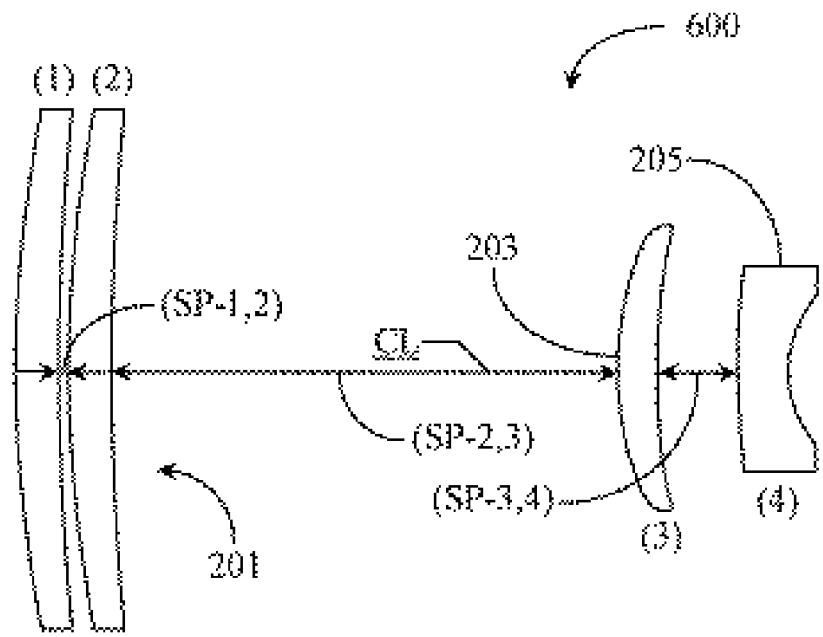
FIG. 6A is a side view of an enhanced lens arrangement for a Galilean type binocular system according to an embodiment of the present invention.
FIG. 6B is a table 601 listing lens specifications for lens of FIG. 6A according to a preferred embodiment.

FIG. 6A is a side view of an enhanced lens arrangement 600 for a Galilean type binocular system according to an embodiment of the present invention. FIG. 6B is a table 601 listing lens specifications according to a preferred embodiment.

Referring now to FIG. 6A, meniscus pair 201 is further labeled as objective meniscus lens (1) and objective meniscus lens (2) for the purpose of differentiating between the two. Field lens 203 is further identified as field lens (3) and eye lens 205 is further identified herein as lens (4). The space between lens (1) and lens (2) in this example is (SP-1,2) measured at the horizontal center of the pair. The space between lens (2) and lens (3) is (SP-2,3) measured from the horizontal center of the lenses. Finally, the space between lens (3) and lens (4) is (SP-3,4) measured at the horizontal center of the lenses.

Referring now to FIG. 6B table 601, the specifications are listed under columns labeled, from left to right, front radius, back radius, center thickness (CT), space, material, and diameter. In provision of optimized sports binocular in accordance with the present invention, empirical testing and result taking provides the preferred specifications listed in table 601 for the lenses in arrangement 600 of FIG. 6A. However, these specifications should not be construed as limiting as the same lens arrangement may be provided with lenses that vary from the stated specifications, which still produce an optimized system wherein focusing and eye separation adjustments are not required.

Referring now to table 601, in a preferred embodiment, objective lens (1) has a front convex (CX) radius of approximately 4.62 inches. Lens (1) has a back concave (CC) radius of approximately 10.01 inches. Lens (1) has a center thickness of approximately 0.45 inches. The spacing between lens (1) and lens (2) or (SP-1,2) of FIG. 6A is approximately 0.05 inches. The preferred material for lens (1) is acrylic. The preferred diameter is 2.4 inches.

Objective lens (2) has a front convex (CX) radius of approximately 3.79 inches. Lens (2) has a back concave (CC) radius of approximately 4.63 inches. Lens (2) has a center thickness of approximately 0.35 inches. The spacing between lens (2) and lens (3) or (SP-2,3) of FIG. 6A is approximately 4.07 inches. The preferred material for lens (2) is acrylic. The preferred diameter is 2.4 inches.

Field lens (3) has a front convex (CX) radius of approximately 0.82 inches. Lens (3) has a back concave (CC) radius of approximately 1.81 inches. Lens (3) has a center thickness of approximately 0.30 inches. The spacing between lens (3) and lens (4) or (SP-3,4) of FIG. 6A is approximately 0.33 inches. The preferred material for lens (3) is borosilicate (BS) Crown. The preferred diameter is 1.35 inches.

Eye lens (4) has a front convex (CX) radius of approximately 15.79 inches. Lens (4) has a back concave (CC) radius of approximately 0.65 inches. Lens (4) has a center thickness of approximately 0.13 inches. The preferred material for lens (4) is a high-grade polycarbonate, however flint glass may also be used. The preferred diameter is 1.00 inches. If lens (4) were provided in flint glass material, the front radius would be slightly concave rather than convex.

FIG. 7A is a graph 700 illustrating color absorption of objective filter 506 of FIG. 5A. In color theory, the color range that the human eye can see is generally known and documented in terms of wavelengths of light measured in nanometers (nm). Generally speaking at the range of 400 to 450 nm, the color is ultra (violet) light. From 450 to 500 nm, blue to cyan (lighter blues) are dominant. From 500 to 600 nm, green light is dominant. At 600 to about 650 nm yellow to orange is dominant. From 650 to 700 nm, orange to reds are dominant. Beyond 700 nm, reds turn to infrareds that are not visible.

Referring now to graph 700, at 400 nm there is no visible color, however between 400 to 500 nm, the absorption filter 506 transmits very little blue light as might be the case of an Acrolite™ "yellow" filter described further above. Between 500 and 600 nm, the filter allows up to 80% greens and yellows. Between 600 and 700 m, the filter allows up to 90% of the orange and reds. As described further above with reference to FIG. 5A, the human eye responds more to yellows and greens and less to blues and reds. Therefore, the effect of fixed filter 506 is an appearance of more of a bright greenish yellow when viewing the image providing better color contrast. As illustrated in FIG. 5A, a fixed color filter might also be provided between the field lenses and the eye lenses. Such a filter could be an absorption filter or a multi-layered, fixed substrate filter that may be used in the binocular system in addition to or in place of filter 506. One good example of such a filter might be a GAMCOLOR™ 395 Golden Sunset filter known to the inventor. Such a filter may be a multi-layered film substrate as described further above.

FIG. 7B is a graph 701 illustrating color transmission spectrum of a fixed multi-layer substrate filter placed between the field lens and eye lens according to an embodiment of the present invention. Also referred to as an ocular fixed filter, graph 701 illustrating multi-layer film properties transmits only about 10% blue at 450 nm similar to the objective filter. The ocular filter transmits about 80% green at 550 nm. The ocular filter transmits less yellows and reds than the objective filter. Comparatively speaking, both filters provide similar contrast enhancement by themselves. They may also be used in conjunction with each other.

Figures 7C, 7D:
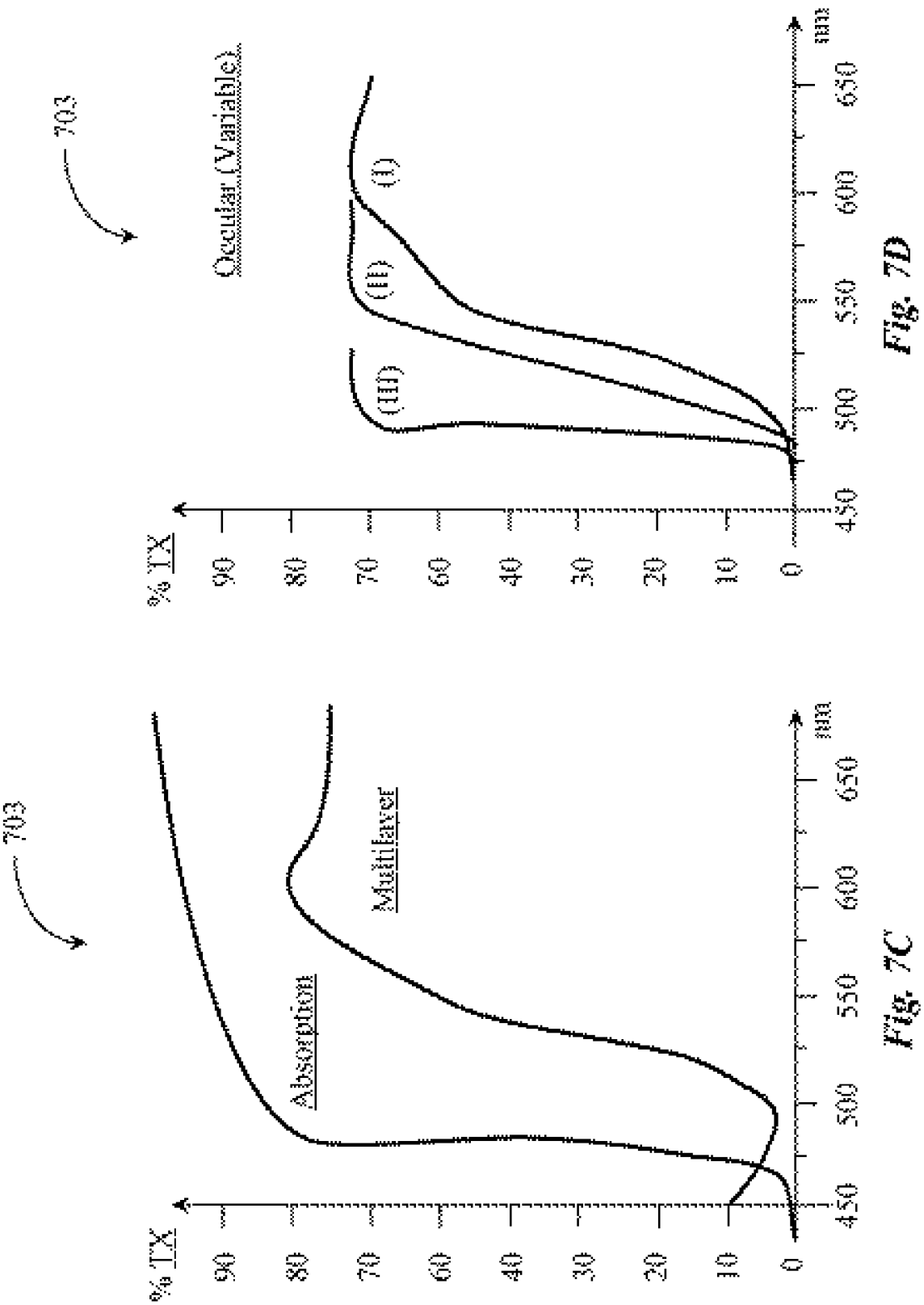
FIG. 7C is a graph illustrating a comparison between a standard absorption filter and a multi-layered Dichroic type filter according to an embodiment of the present invention.
FIG. 7D is a graph illustrating variable color transmission control by an angularly layered filter according to an embodiment of the present invention used in combination with a fixed absorption filter.

FIG. 7C is a graph illustrating a comparison between a standard absorption filter and a multi-layered Dichroic type filter according to an embodiment of the present invention.

The absorption filter used as an objective filter transmits very little if any blue light at 450 nm, the beginning of the visible wavelength. At 500 nm, the cyan and green shoots up to 90% transmission between 500 and 550 nm. Likewise, the filter allows over 90% yellows and reds after 600 nms. In contrast, the multi-layered interference filter allows about 10% blue light at 450 nm. Transmission of blue decreases to less than 5% at 475 nm. Greens are transmitted sharply up to 80% between 500 and 600 nms (beginning of yellow spectrum). After 600 nm, the yellows drop to about 75% as well as orange and reds. It is clear that the multi-layered eye lens filter can be used as a fixed filter successfully in combination with or in place of the objective interference filter. However, the multi-layered filter may be provided as a variable filter as described above in FIG. 5A with respect to color variable filter mechanism 501 placed just in front of the field lenses 203 and 204. A graph showing color transmission variance with respect to substrate location is provided below.

FIG. 7D is a graph illustrating variable color transmission of a variable multi-layered filter according to an embodiment of the present invention used in combination with a fixed absorption filter. The represented curves on graph 7D represent three different cases where both filters are used, but where the variable filter is subsequently caused to rotate off perpendicular by turning wheel 504 of mechanism 501 described above in FIGS. 5C and 5D.

In curve (I), both the absorption filter and the multi-layered filter are perpendicular to the line of sight. In curve (I) there is 70% yellow at 600 nm, about 40% green and about 0% blue at 450 nm. The appearance for the user would be like looking through the multi-layered interference eye lens filter alone as in FIG. 7C while wearing gray sunglasses. This is because the interference filter does not transmit shorter wavelengths transmitted by the front absorption filter.

Curve (II) illustrates the use of both a fixed absorption filter as described above with a multi-layered substrate filter, with the variable filter tilted about 22.5 degrees off of perpendicular. As can be seen by the plotted curve, there is a much higher percentage of greens and on into yellows at 600 nm. At this color range, the human eye is more sensitive. The appearance for a user then is a color contrast that reveals strikingly more bright greens and yellows. The former reddish cast of curve (I) is completely removed by the rotation of the substrate thus producing curve (II).

Further rotation of the variable color multi-layered, filtering mechanism 501 results in curve (III), at about 45 degrees rotation, where the color effects of multi-layer substrate effectively disappear. The color effect is as though the user is only looking through the objective absorption filter 506 of FIG. 5A. The overall brightness of the image is diminished only slightly. Curve (III) can be compared with the absorption curve in FIG. 7C, curve III having similar spectral range but less brightness. Importantly, the invention using mechanism 501 has been found to provide remarkable control over color contrast just by turning the wheel 504 slightly off perpendicular and this provides the user with an enjoyable viewing experience.

Figure 7E:
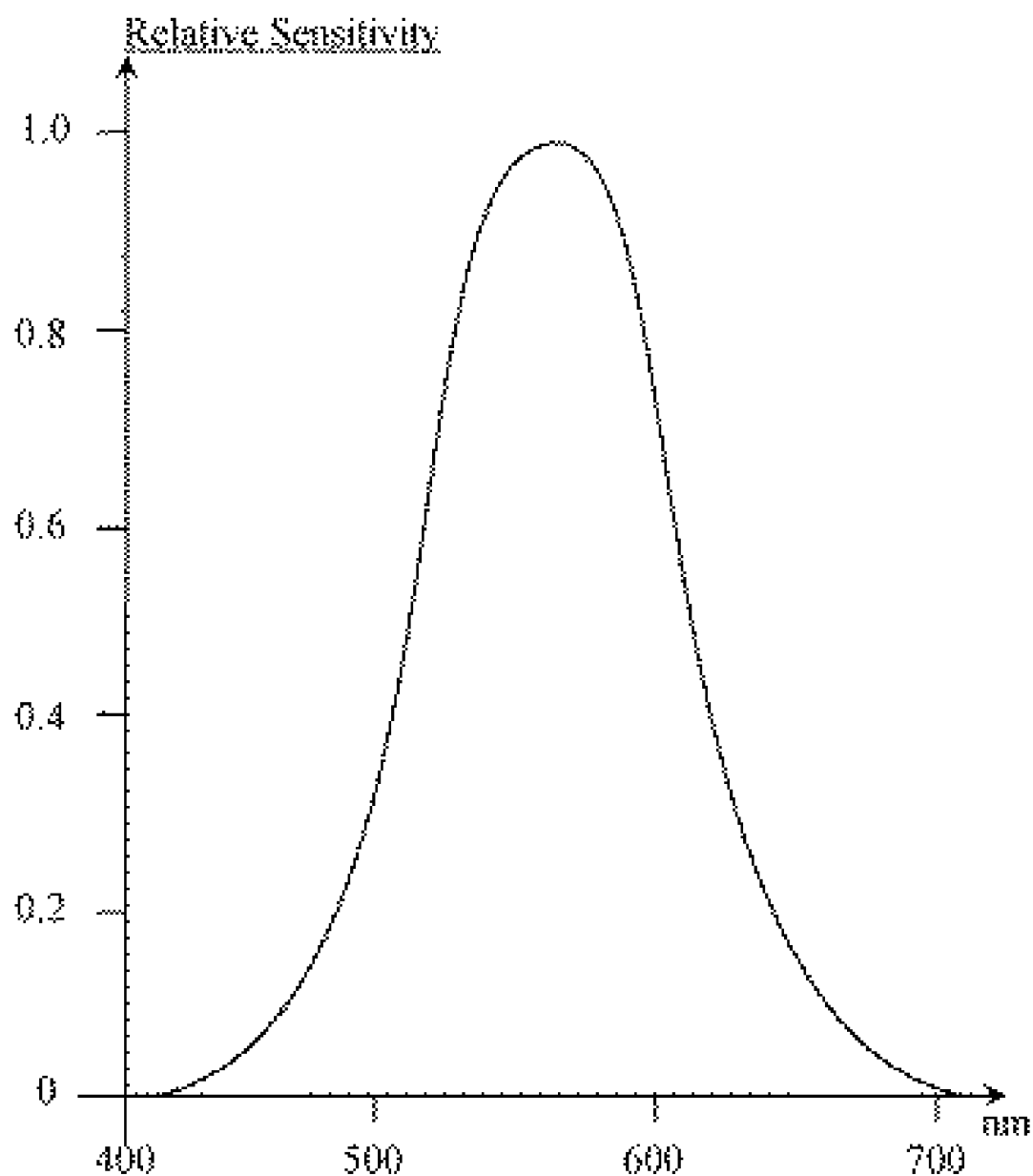
FIG. 7E is a graph illustrating a normal color sensitivity response curve of the human eye viewed in daylight.

FIG. 7E is a graph illustrating the normal color sensitivity response curve of the human eye during daylight. It may be appreciated by the skilled artisan that the human eye normally is sensitive to certain colors over certain wavelengths over a fairly constant curve represented in this view. At about 425 nm the sensitivity rises sharply to a peak and then drops off sharply relative to the visible colors of the spectrum, ultra violet and infrared not being visible.

It is noted herein that in one embodiment of the invention already described, there is at least one filter which is essentially fixed or otherwise unchanging relative to the color spectrum allowed to pass through it while one or more other filters are caused to pass a changing spectrum by change of angle or position. Relative to this particular exemplary embodiment, the bell shaped response curve of the human eye relative to the visible color spectrum as shown here in FIG. 7E is utilized in accordance with the invention to leverage the color contrast of colors viewed by manipulating at least one angle or position-sensitive filter.

One with skill in the art will clearly visualize upon inspection of the human eye response curve of FIG. 7E, and then comparing it to the response curve of a long wave pass filter, such as the multiplayer interference curve of FIG. 7C that a result is a marked change in color contrast perceived by the human eye. It is further apparent in the embodiment just described that filters passing a fixed color spectrum are utilized in sequence with the movable variable filters to limit the passage of contrast impeding wavelengths, for example blue wavelengths, thus making those wavelengths not limited by the variable filter appear even brighter to the eye. In implementing the invention according to the particular embodiment, long pass wave filters or short pass wave filters may be used.

Figure 8A:
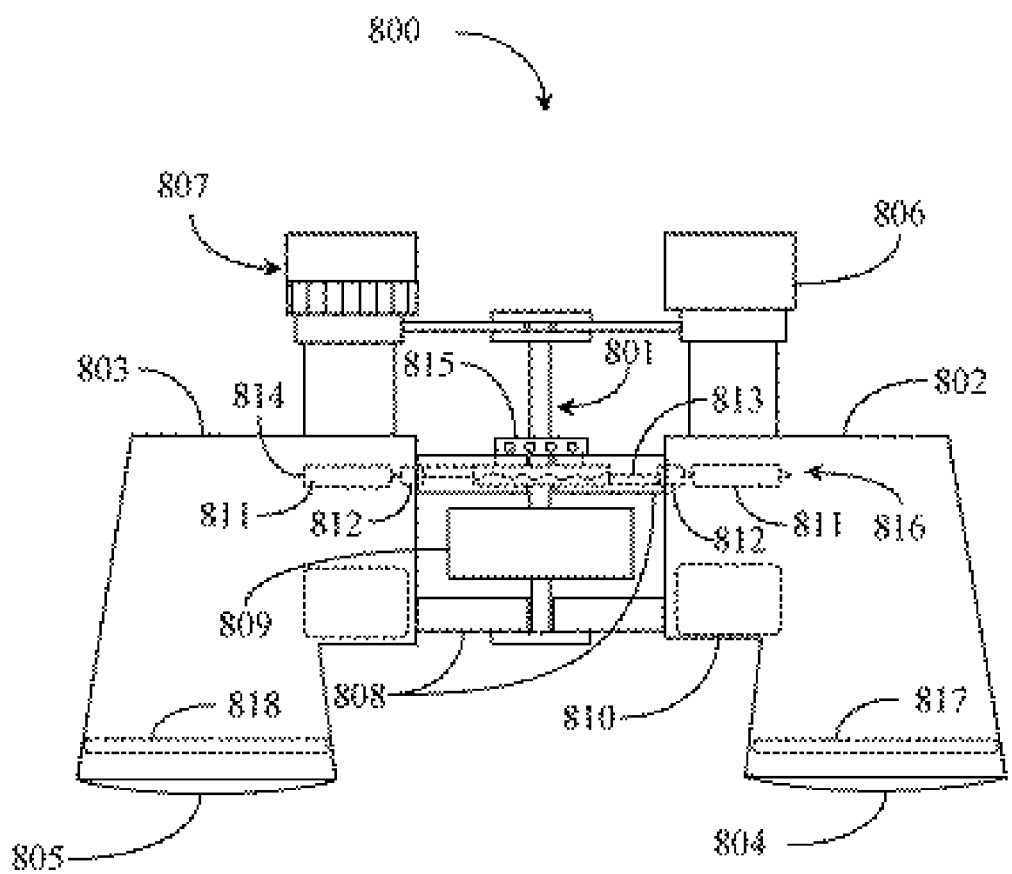
FIG. 8A is a top view of a binocular system having prisms and focusing an internal image enhanced with variable color contrast capability according to an embodiment of the present invention.

FIG. 8A is a top view of a binocular system 800 having prisms 810 for focusing an internal image enhanced with variable color contrast capability according to an embodiment of the present invention. System 800, unlike Galilean system 100 of FIG. 1A has internal prisms for providing an image internally that the user can see through the ocular lenses of the system. System 800 has a left barrel 802 and a right barrel 803. Barrels 802 and 803 house prisms 810 and objective lenses 804 and 805 respectively. Barrels 802 and 803 also support eyepiece barrels 806 and 807 that serve as housings for ocular lenses (not illustrated). Barrels 802 and 803 are held together in a substantially parallel relationship via connecting wings 808 rotably mounted to a central shaft 801.

A focus wheel 809 provides frontward and rearward movement of ocular eyepieces contained within eyepiece barrels 806 and 807. Barrel 807 has a focus adjustment wheel for adjusting focus to a user's particular eyesight capabilities typical of prism bearing binocular systems. System 800 must be adjusted for eye separation and must be focused accordingly with sighting an object.

In one embodiment of the present invention, objective color filters may be provided and are illustrated in this example as a left side objective absorption filter 817 and a right side objective absorption filter 818. In this example, objective filters 817 and 818 are fixed in place and work to filter out blue light similar to objective filter 506 described further above with respect to FIG. 5A. Also provided within system 800 is a variable color control mechanism 816. Mechanism 816 comprises multi-layered color interference filter cells 811 held spaced apart and in substantially parallel relationship on separate shafts 814. Cells 812 may be coated lens elements or supporting rings filled with a multi-layered substrate. Shafts 814 are each affixed to geared wheels 812 having gear teeth arranged on the side opposite the connected shafts. Shafts 814, multi-layered cells 811, and geared wheels 812 encompass separate components of mechanism 816 one each mounted into each barrel of system 800. The mounting is such that each shaft is rotable to an extent; the cells fixed then in a parallel arrangement and in the same plane.

Mechanism 816 has two opposing geared arms 813, one disposed at each side of central shaft 801 such that the geared end of each arm 808 engages each geared portion of wheels 812. Geared arms 813 are in a preferred embodiment, separately affixed or engaged on a thumb lever 815 having an annular portion mounted rotably about central shaft 801. Thumb lever 815 extends upward from shaft 801 so that a portion of the lever is easily accessible to a user holding the binocular system. The user may move lever 815 to the left or right a fixed or limited distance. The distance that lever may be moved in either direction shall be limited only by the motion range that is afforded to the gear teeth on arms 813 when engaging the gear teeth on geared wheels 812. Shafts 814, wheels 812 and thumb lever 815 including arms 813 may be manufactured of steel, aluminum or a rigid plastic.

Figure 8B:
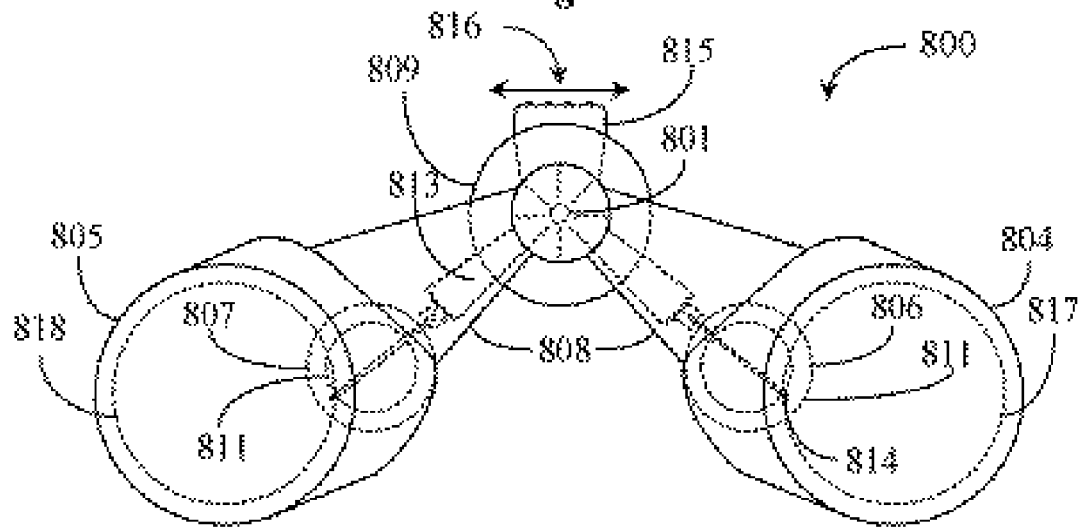
FIG. 8B is a front view of the binocular system of FIG. 8A according to an embodiment of the present invention.

FIG. 8B is a front view of binocular system 800 according to an embodiment of the present invention. Multi-layered cells assume a perpendicular position when thumb lever 815 is positioned at dead center on shaft 801. In this position, cells 811 are substantially concentric with eyepiece tubes 806 and 807 and parallel in a separate plane with respect to ocular lenses. In practice of the invention in this embodiment, a user may urge thumb lever 815 to the left or right causing geared arms 813 to translate motion to engaged geared wheels 812, which in turn causes rotation of shafts 814 and therefore of multi-layered cells 811 such that they deviate one way or the other way from their original perpendicular positions with respect to the line of sight in front of the ocular lenses of the system. Variable color control mechanism 816 may be formed of two separate parts comprising a back half including the thumb lever 815 and one geared arm 813, and a front half comprising essentially the other geared arm.

Annular support halves comprising a pressure washer type arrangement may be mounted on central shaft 801, to which the geared arms may be contiguously formed or otherwise affixed to. A back annular washer half may be contiguously formed with thumb lever 815 and one geared arm while the top washer half may be contiguously formed with the other geared arm. A mechanism so designed may be caused to disengage at the washer "halves", which may be radially geared, so that equal rotation of the geared arms about the axis may occur when mechanism 816 is disengaged and eye separation adjustment is being performed wherein the binocular barrels are rotated radially about axis 801. When eye separation is achieved and fixed, then the mechanism parts described, each supporting one geared arm may be caused to reengage so that proper thumb lever function may be initiated at that position to work both cells 811 simultaneously. Thumb lever 815 may be provided as one contiguous piece with respect to geared arms 813 only if the binocular system is fixed at a specific eye separation amount and otherwise not radially adjustable in this respect. Representation of mechanism 816 formed of two parts is better illustrated later in this specification.

Referring now back to FIG. 8A, geared arms 813 are not symmetrically disposed with respect to lever 815. Rather, the left arm engages geared wheel 812 at the bottom peripheral edge of the wheel while the right arm engages its wheel on the top peripheral edge of the wheel. In this way multi-layered cells 811 are rotated in the same direction with respect to each other. In another embodiment arms 813 may be symmetrically formed with respect to lever 815 and may engage geared wheels 812 on the same side of the wheels causing cells 811 to rotate the same amount in opposite directions from one another. The color enhancing effect is the same in either case. Multi-layered cells 811 take position far enough behind prisms 810 and far enough in front of the eye lenses that they may conceivably be rotated to a full extent limited of course by the range afforded to the gears.

Figure 9A:
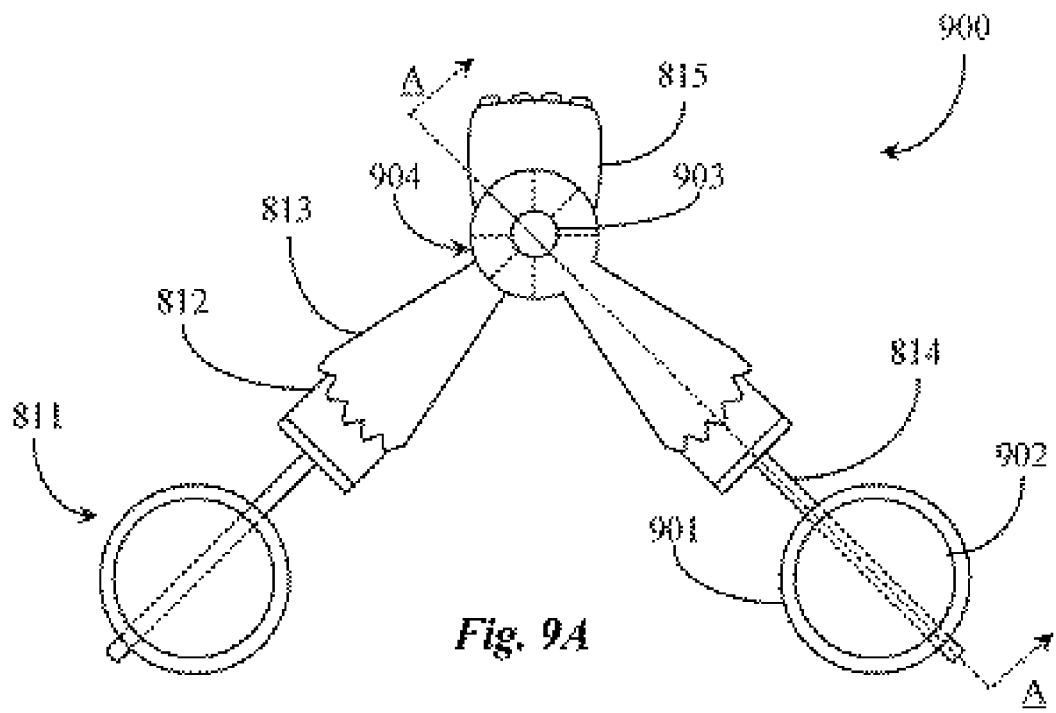
FIG. 9A is a front view of the variable color selection mechanism of FIG. 8A showing greater detail.

FIG. 9A is a front view of variable color selection mechanism 816 of FIG. 8A showing greater detail. Thumb lever 815 has an array of bumps on the accessible surface thereof. The bump array facilitates user comfort and dexterity when urging the lever to the left or to the right. In this view, gear arms 813 are centered and engaged over geared wheels 812. Shafts 814 are mounted in substantially centered positions extending perpendicularly outward from geared wheels 812. Shafts 814 may extend through cells 811 to opposite sides in one embodiment. In another embodiment, they may extend only to rings 901. Rings 901 enclose multi-layer coated lens elements or substrates 902.

In this example, mechanism 816 comprises two separable parts that engage each other via radial geared "half" washers mounted on a central shaft such as shaft 801 of FIG. 8A. An opening 903 is provided for mounting over the shaft in a manner so as not to have much play over the shaft when rotating about the shaft in either direction. One part disposed to the rear in this view includes thumb lever 815 and a right-side geared arm 813. The other part disposed directly over the just described part includes the left-side geared arm. The washer 904 is illustrated as radially geared on its engaging surfaces and may be thus separated, rotated and then re-engaged in accordance with required eye separation adjustment. Once washer 904 is re-engaged (both halves), normal cell rotation via thumb lever 815 may resume. A spring loaded pull pin or sleeve (not illustrated) may be provided at the back portion of mechanism 816 and mounted to the central shaft such as shaft 801 of FIG. 8A. Such a device can be used to disengage mechanism 816 while adjusting for eye separation. An allowable eye separation angle will be one that also coincides with incremental alignment of radial gears on the facing surfaces of washer 904. In this way, the washer may be engaged at a new angle, the separation fixed then until the pin or sleeve is pulled out to readjust eye separation for a different user with a different requirement.

Figure 9B:
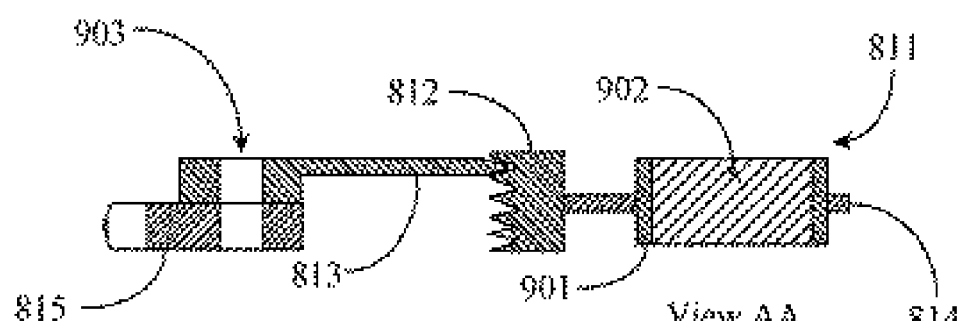
FIG. 9B is a section view of the variable color contrast mechanism of FIG. 9A taken generally along the section line AA.

FIG. 9B is a section view of mechanism 816 of FIG. 9A taken generally along the section line AA. In this view cell 811 includes ring 901 illustrated as enclosing multi-layer film lens or substrate 902. Shaft 814 is centrally affixed to the back of geared wheel 812. Wheel 812 has gear teeth on one side engaged by gear teeth on geared arm 813. Engagement is on the upper peripheral edge of wheel 812. Opening 903 is illustrated through the top portion of mechanism 816 and through the bottom portion partially illustrated. A portion of lever 815 is also illustrated. Radial gears on opposing faces of washer 904 are not illustrated in this view may be assumed to be present.

Figure 9C:
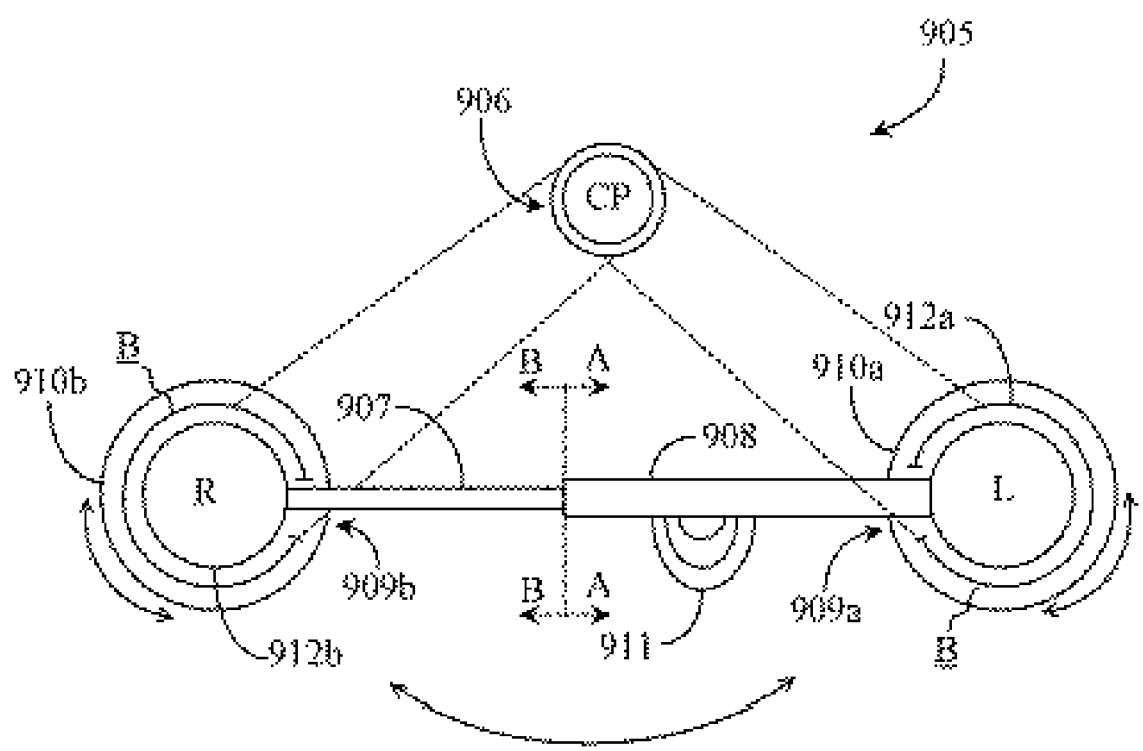
FIG. 9C is a front elevation view of a variable color contrast mechanism according to another embodiment of the present invention.

FIG. 9C is a front elevation view of a variable color contrast mechanism 905 according to another embodiment of the present invention. Color contrast mechanism 905 includes a telescopic arrangement of a splined rod 907, which fits inside a tube 908 having a suitable slot or groove for accommodating the spline feature of rod 907. In this example, rod 907 may be a steel rod, an aluminum rod, or one manufactured of a durable polymer material. Tube 908 may be a steel tube, an aluminum tube, or otherwise a tube made of a durable material like a hard plastic or polymer material.

Tube 908 is supported by a barrel support ring 910*a*, which is rotably mounted over a left binocular barrel (B). Support ring 910*a* has an opening placed strategically there through for accommodating the outside diameter of tube 908. Likewise, left barrel B has an elongated opening 909*a* adapted to accommodate the outside diameter of tube 908 including a specific range beyond the diameter to allow for barrel adjustment for eye separation. A left (L) dichroic filter element 912*a* is attached at one end of tube 908 and is disposed laterally to within the left barrel and positioned in a substantially concentric relationship to the inside diameter of the barrel. Opening 909*a* is sufficiently elongated to enable ring 910*a* to rotate annularly about the left barrel during eye separation adjustment such that filter element 912*a* remains positioned as described above within the left barrel.

Tube 908 has a thumb lever 911 provided thereon and adapted to enable a user to turn tube 908 about its longitudinal axis thereby also turning dichroic filter element 912*a* off of perpendicular with respect to a vertical axis of the left barrel. Rod 907 is fitted into tube 908 and may slide within tube 908 a certain extent defined by motion range resulting from an eye separation adjustment of the left and right barrels in an arc about a center pin (CP) 906. The length of elongate opening 909*a* provided through the left barrel limits the amount of rotation allowed for eye separation.

Rod 907 is splined (not illustrated) so that it may fit inside tube 908 in a manner that when tube 908 is rotated, it translates the same amount of rotation to rod 907. A support ring 910*b* is provided and is mounted rotable over the right barrel (B). Ring 912*b* has an opening placed there through adapted to accommodate the outside diameter of rod 907. Rod 907 is not splined along a portion of its length adjacent to ring 910*b*. The right barrel (B) has an elongated opening 909*b* provided there through and adapted to accommodate the outside diameter of rod 907 including a range of motion for eye separation as defined above. A right dichroic filter element 912*b* is fixedly attached to rod 907 and laterally disposed within the right barrel in substantial concentric relationship to the inside diameter of the barrel. Dichroic filer elements 912*a* and 912*b* are sufficiently annular in profile and relatively thin in thickness. Elements 912*a* and 912*b* may be manufactured of a durable polymer or a glass lens element that is coated to enable dichromatic function of the elements.

The spline arrangement between rod 907 and tube 908 enables both to be rotated together the same amount by a user operating thumb lever 911 forwardly or backwardly with respect to this particular front view of mechanism 905. Dichroic filter elements 912a and 912b are aligned in substantially the same plane by the spline geometry such that they also rotate the same amount in tandem forward or backward. When eye separation adjustment is being performed by physically moving the left and right barrels in toward each other or outward from each other as allowed by CP 906, rod 907 slides in the appropriate direction within tube 908 enabling filter elements 912a and 912b at other end of the mechanism to remain sufficiently concentric within their respective barrels. The elongated slots 909 and 909b accommodate the position change. Once eye separation is achieved, the user may then operate thumb lever 911 in order to rotate filter elements 912a and 912b in tandem in either direction off perpendicular.

Figure 9D:
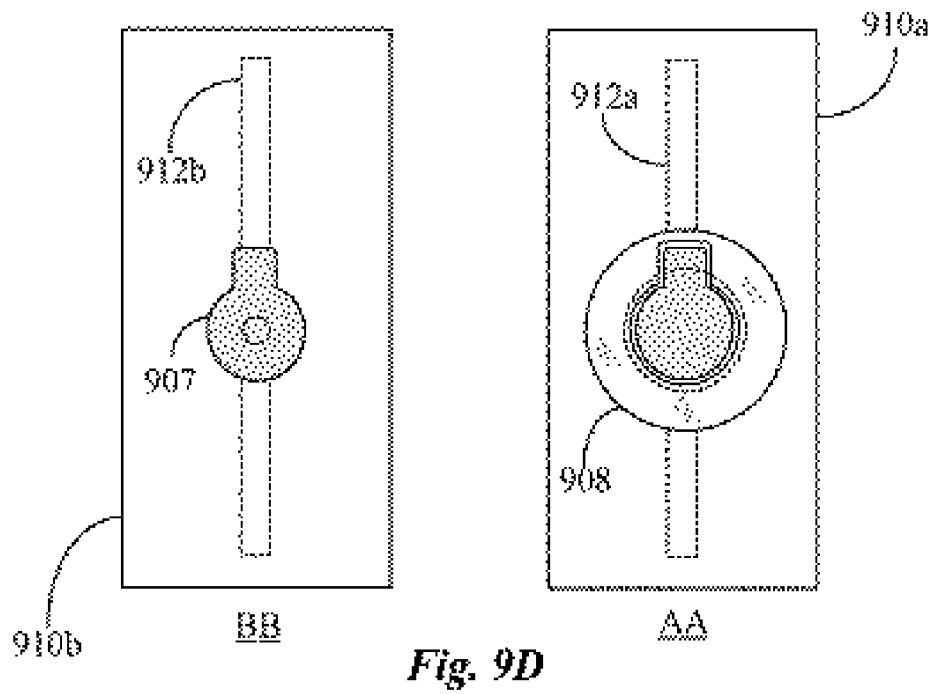
FIG. 9D is a compiled cut view of the rod and tube of the mechanism of FIG. 9C viewed from the vantage of cut lines AA and BB illustrating end profiles of both components.

FIG. 9D is a compiled cut view of rod 907 and tube 908 of the mechanism of FIG. 9C viewed from the vantage of cut lines AA and BB illustrating end profiles of both components. In view BB rod 907 has a spline provided in the form of a rectangular spline. This is not specifically required in order to practice the invention as other spline geometries might be substituted therefore. For example, rod 907 may have a spline formed contiguously therewith along a portion of its length, or the arrangement may be that of a slot and key insert. There are many possibilities.

Rod 907 is attached to filter element 912b in view BB at substantial center, although this is not specifically required as long as some rotation may occur of the filter element within the barrel without being impinged by the inside wall of the barrel. Theoretically, element 912b may be rotated 90 degrees to horizontal although a small angle of rotation is sufficient for the purpose of the present invention. Ring 910b may be mounted over the barrel using bearings and stops to attain rotability about the barrel and to attain the correct linear position on the barrel.

In view AA, Rod 907 is disposed within tube 908. Tube 908 has a slot formed therein for accommodating the spline of rod 907. Tube 908 connects to filter element 912a at substantial center as described above with respect to the junction of rod 907 and filter element 912b. The end of tube 908 that attaches to filter element 912a may be tapered or otherwise formed down from the major OD to better facilitate attachment. It is important to note here that the exact method of attaching filter elements 912a and 912b to respective components 908 and 907 may vary widely and may include such as gluing, welding, or screw-mounting depending at least in part on design.

Figure 9E:
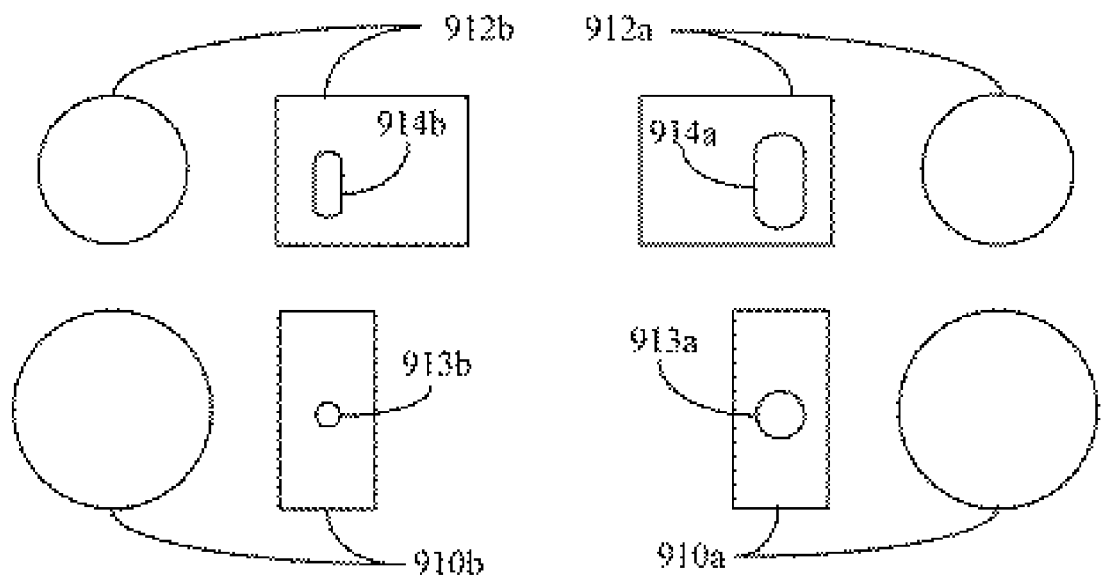
FIG. 9E is a component view of the filter rings of FIG. 9D and of associated barrel sections involved in ring mounting according to an embodiment of the present invention.

FIG. 9E is a component view of filter rings 910a and 910b of FIG. 9D and of associated barrel sections involved in ring mounting according to an embodiment of the present invention. Support ring 910a has an opening 913a provided through one wall. Opening 913a is adapted to accommodate the outside diameter of tube 908 described earlier. Ring 910b has opening 913b provided through one wall and adapted to accommodate the outside diameter of rod 907. Rings 910a and 910b are illustrated in associated front views logically showing outside diameter only.

Barrels 912a and 912b are similarly illustrated herein with openings 914a and 914b. Opening 914a is adapted as a wider opening for tube 908 than opening 914b, which is adapted for rod 907. The outside diameter references of barrel portions 912a and 912b are illustrated in this view.

Figure 9F:
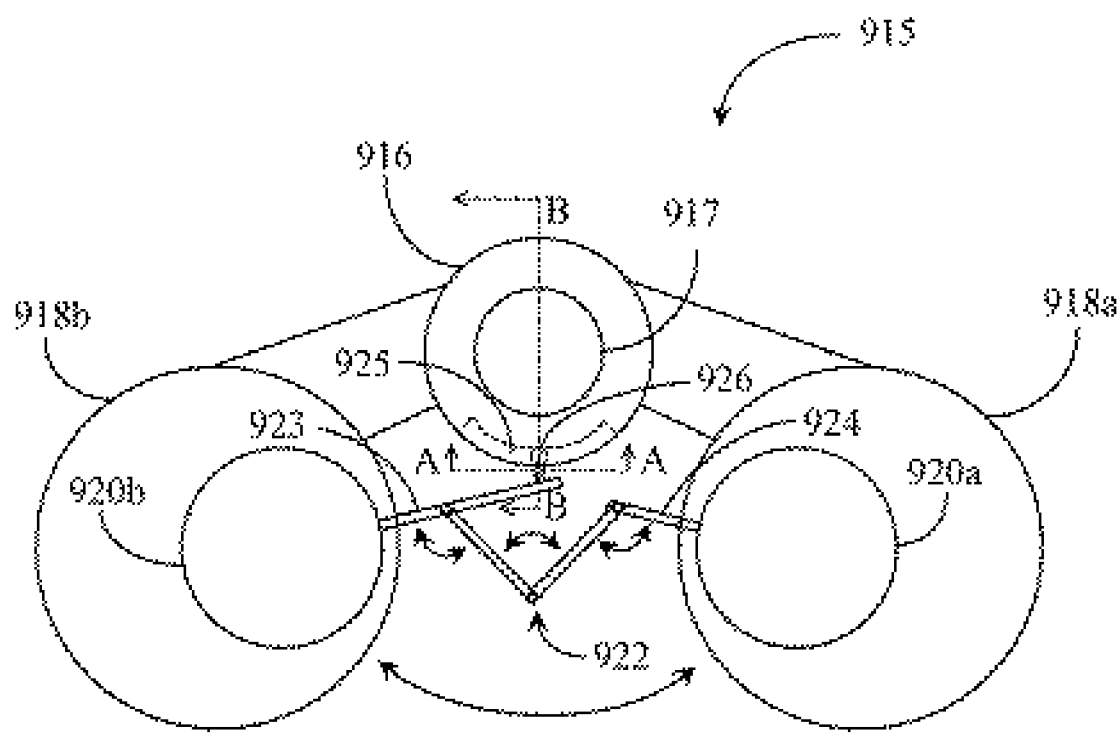
FIG. 9F is a front view of a variable color contrast mechanism according to another embodiment of the present invention.

FIG. 9F is a front view of a variable color contrast mechanism 915 according to another embodiment of the present invention. Mechanism 915 may be provided to a Galilean or prism bearing binocular as described further above with respect to mechanism 905 of FIG. 9C. Mechanism 915 is controlled by a rotation wheel 916 mounted over a central binocular pivot shaft 917 adjacent to and in front of a focus wheel (not illustrated). In this particular exemplary embodiment, a left binocular barrel 918a and a right binocular barrel 918b are illustrated and are adjustable for eye separation as evidenced by a double arrow arc placed beneath the illustration. Dichroic substrates 920A and 920b are illustrated in position within barrels 918a and 918b respectively. A scissor assembly 922 connects substrates 920a and 920b, which is expandable and contractable according to eye separation movement of the barrels. Assembly 922 is pinned at one end of the assembly to a mechanism drive rod 923 to which substrate 920b is mounted. Assembly 922 is pinned on the other end to a positioning rod 923 connecting at one end to substrate 920a and at the other end to a substrate position rod 924.

Scissor assembly 922 is rotably pinned to rods 923 and 924 such that by expanding or contracting the angle of opening of the assembly the angles represented by the pinned junctions on either side of the assembly change accordingly enabling substrates 920a and 920b to remain in their intended positions through adjustment for correct eye separation of a user.

A drive link-pin is provided and adapted to connect drive rod 923 to rotation wheel 916. Drive link-pin 926 is slidably retained within an elongate and arcurate groove 925 placed within and along a portion of the peripheral surface of rotation wheel 916 at a uniform depth. The other end of link 926 is connected to drive rod 923. Turning rotation wheel 916 either left or right displaces link 926 laterally within groove 925 causing synchronous rotation of substrates 920a and 920b about their mounting axis with respective rods 924 and 923 resulting in desired filter function. Drive link-pin 926 has a ball or annular head that is retained within groove 925. The walls of groove 925 may be machined at an inward angle so as to provided retention of the pinhead within the groove during normal operation. In one embodiment, rotation wheel 916 is manufactured of a resilient polymer material and drive-link pin 926 may be snapped into the groove via the pinhead.

In this view, drive link-pin 926 is occupying a dead center position within groove 926 resulting in perpendicular-to-line of sight orientation of substrates 920a and 920b. However, moving rotation wheel 916 to the left or right displaces drive link-pin 926 laterally along groove 925 also causing a planar displacement with respect to the vertical plane of mechanism 922. Therefore, such displacement away from vertical center causes synchronous rotation of the substrates off perpendicular in one or the other direction depending upon which direction wheel 916 is rotated about shaft 917.

Figure 9G:
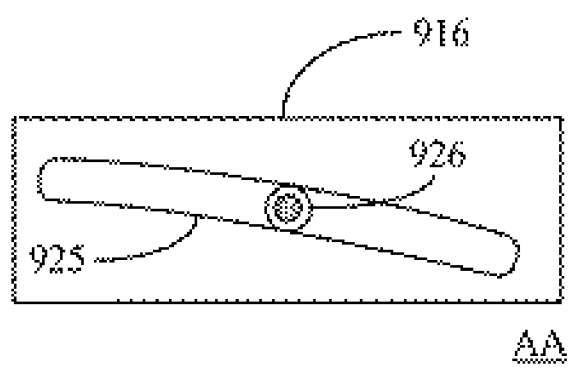
FIG. 9G is an enlarged section view of the rotation wheel of FIG. 9F taken generally along the section lines AA of FIG. 9F.

FIG. 9G is an enlarged section view of rotation wheel 916 taken generally along the section lines AA of FIG. 9F. Groove 925 runs laterally around a length of the periphery of wheel 916 and at an angle diverting from the longitudinal centerline of the wheel. Groove is machined or otherwise formed of a depth and wall construction to accept the pinhead portion of link 926 and also retaining the link in a slidable position within the groove.

Figure 9H:
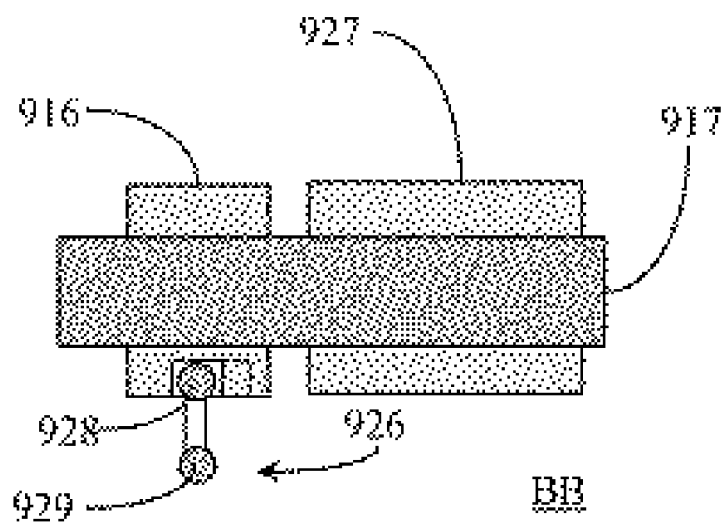
FIG. 9H is an enlarged section view of a portion of the central shaft of FIG. 9 F illustrating the rotation wheel and drive link-pin taken generally along the section lines BB of FIG. 9 F.

FIG. 9H is an enlarged section view of a portion of central shaft 917 illustrating rotation wheel 916 and drive link-pin 926 taken generally along the section lines BB of FIG. 9 F. The illustrated portion of binocular center shaft or pin 917 runs through a focus wheel 927 and adjacent rotation wheel 916. Link-pin 926 has a pinhead 928 (described above) adapted to fit into and to be retained within groove 925. A second pinhead or ball 929 is provided at the opposite end of the link for mounting to the drive rod (not illustrated). Barrels 918a and 918b each have elongated slots provided there through at the locations where rods 923 and 924 enter. The slots enable relief for the eye separation movements and angular rod displacement during color contrasting operations using wheel 916.

Figure 9I:
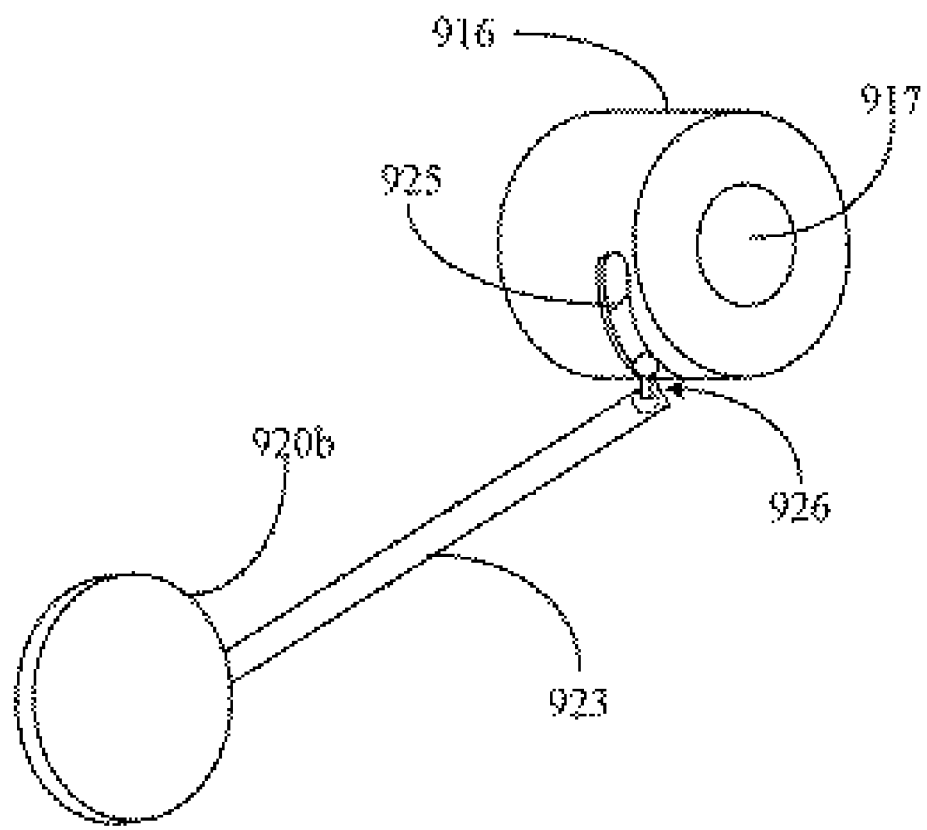
FIG. 9I is an enlarged peripheral view of the drive rod of FIG. 9F illustrating the rotation ability of the substrate via the drive link-pin when displaced laterally within the helical groove of the rotation wheel.

FIG. 9I is an enlarged peripheral view of drive rod 923 and the rotation ability of substrate 920*b* via drive link-pin 926 when displaced laterally within groove 925 of wheel 916. Wheel 916 may be rotated in either direction to forcibly displace link-pin 926 laterally along groove 925. As the link-pin approaches some distance past dead center in the slot, the angular displacement caused by groove construction results in substrate rotation. The same action is communicated to the other substrate through scissor assembly 922.

Figure 10:
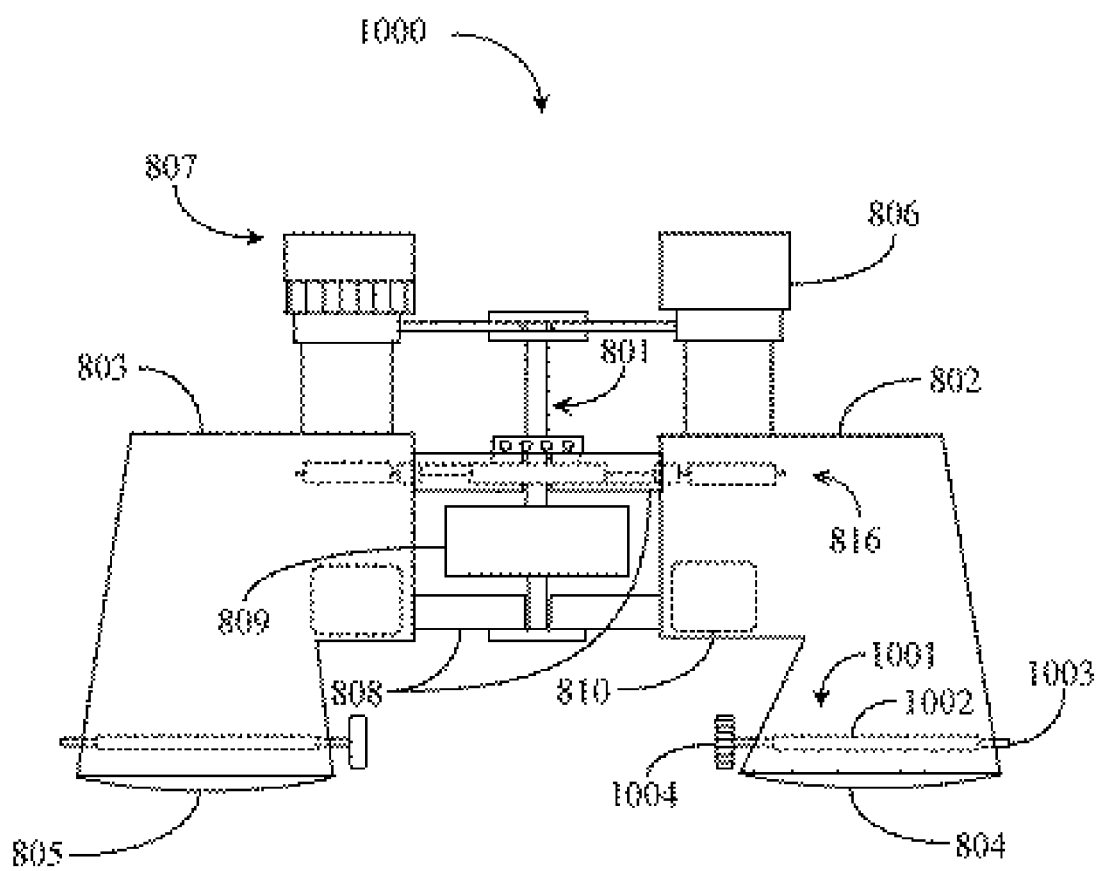
FIG. 10 is a top view of a binocular system enhanced with variable color objective filter mechanisms according to another aspect of the invention.

FIG. 10 is a top view of a binocular system 1000 enhanced with variable color objective filter mechanisms according to another aspect of the invention. Instead of variable multi-layer filter mechanism 816, system 1000 includes two variable color filter mechanisms 1001. One mechanism 1001 is incident to the left barrel 802 and the other identical mechanism is incident to the right barrel 803. Located just behind objective lenses 804 and 805, filter mechanism 1001 includes a shaft 1003 horizontally mounted through the supporting barrel. Shaft 1003 may be provided of steel or aluminum and supports a multi-layered interference film coated substrate 1002 of an annular or of a rectangular profile. It should be noted herein that the type of multi-layered substrate coating might be a "long pass", "short pass", or "spike" filter without departing from the spirit and scope of the present invention. It is known that yellows and greens are middle wavelength while blues are shorter wavelength and reds are longer wavelength. The invention pertains particularly to the variable and fixed use of these filters both independently and in combination in both Galilean and modern prism bearing binocular systems. System 1000 is simple to construct, but may, in some embodiments, require adjustment of two variable filter cells independently by the user. Mechanism 1001 includes a turn wheel 1004. The entire mechanism is mounted using friction bearings or other friction or pressure mount so that the rotated position of substrate 1002 remains after each turn.

In this embodiment, objective substrates 1002 may be independently operated such that the angle of the substrate on the left side may not be the same as the angle of the substrate on the right side. Turn wheel 1004 may be provided with scoring to facilitate easy turning. In one embodiment, an indicative mark may be provided on wheel 1004 to indicate at least one angled position such as perpendicular. Also in this embodiment, mechanism 816 may be unnecessary as fixed absorption filters such as filter 811 may be conveniently located as shown between prisms and eye lenses or anywhere else along the line of sight.

Referring now back to FIG. 7A, graph 703 Curve I also applies to a use case for system 1000 wherein variable color mechanism 816 is set so that the multi-layered elements are perpendicular and the elements 1002 are absorption filters of the same type as filter 506 described with reference to FIG. 5A. The color range of transmission may be assumed identical or at least, very similar because the absorption filter is not angle sensitive. FIG. 7a Curve (II) represents mechanism 816 turned off perpendicular to approximately 22.5 degrees with filters 1002 remaining substantially perpendicular. Curve (III) represents a case where mechanism 816 is turned 45 degrees off of the line of sight and filters 1002 are held perpendicular to that line of sight. The color variations and transmission levels would remain similar as previously described and as illustrated. However, one with skill in the art will recognize that by using different filters and by turning those filter elements differing amounts in combination with each other, a wide variety of differing color transmission curves may be produced in empirical tests without departing from the spirit and scope of the present invention. Importantly, the invention enables variable color selection and filtering at any point incident to objective or eyepiece lenses, or both.

According to another aspect of the present invention the principle of angle-sensitive multi-layered filter coating is applied to a pair of sunglasses enabling a user thereof to vary the color transmission and apparent brightness of those lenses by causing those coated lenses to be disposed at an angle relative to their original position, which is somewhat perpendicular to the line of sight through the lenses.

Figure 11A:
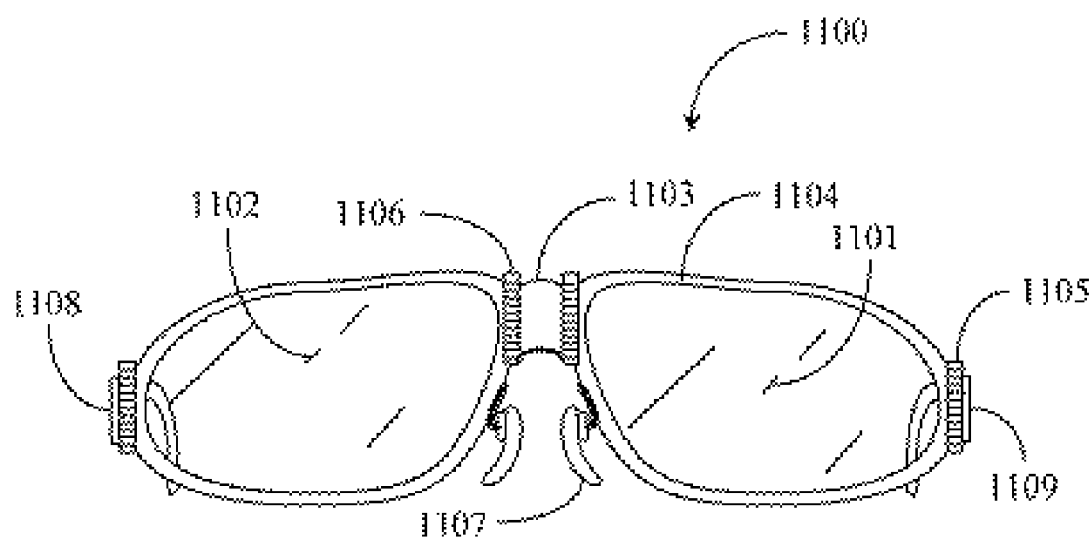
FIG. 11A is a front view of a pair of sunglasses enhanced for variable color selection according to an embodiment of the present invention.

FIG. 11A is a front view of a pair of sunglasses 1100 enhanced for variable color selection according to an embodiment of the present invention. Sunglasses 1100 include a left lens 1101 and a right lens 1102. Both left and right lenses 1101 and 1102 are multi-layered lens elements, which are angularly sensitive in accordance with an embodiment of the present invention. Sunglasses 1100 include a unique hinge arrangement at a bridge 1103 disposed at the center of a lens frame 1104. The arrangement includes 2 hinges 1106 adapted to enable frame 1104 to be angularly disposed from its normal profile at an angular direction toward a user. Lenses 1101 and 1102 may be manufactured plastic or glass lens elements that are subsequently coated as described above. Sunglasses 1100 also include standard nose guards 1107 attached to frame 1104, in this case, with wire.

Sunglasses 1100 also include a unique hinge arrangement disposed at the junctions of frame 1104 and attached arms 1108 and 1109. Hinges 1105 are adapted to enable arms 1108 and 1109 to be angularly disposed away from a user beyond a substantially perpendicular angle with respect to frame 1104 that would otherwise be the far range of opening for arms 1108 and 1109. Hinges 1106 and 1105 are adapted differently from each other with respect to angle range allowed for each hinge, but otherwise may be manufactured from the same materials such as steel, aluminum, brass, plastic, or any other rigid materials. In one embodiment, both hinges 1106 and 1105 may be memory loaded using spring wire or the like (not illustrated) so that they naturally remain at their adjusted angular positions.

Figure 11B:
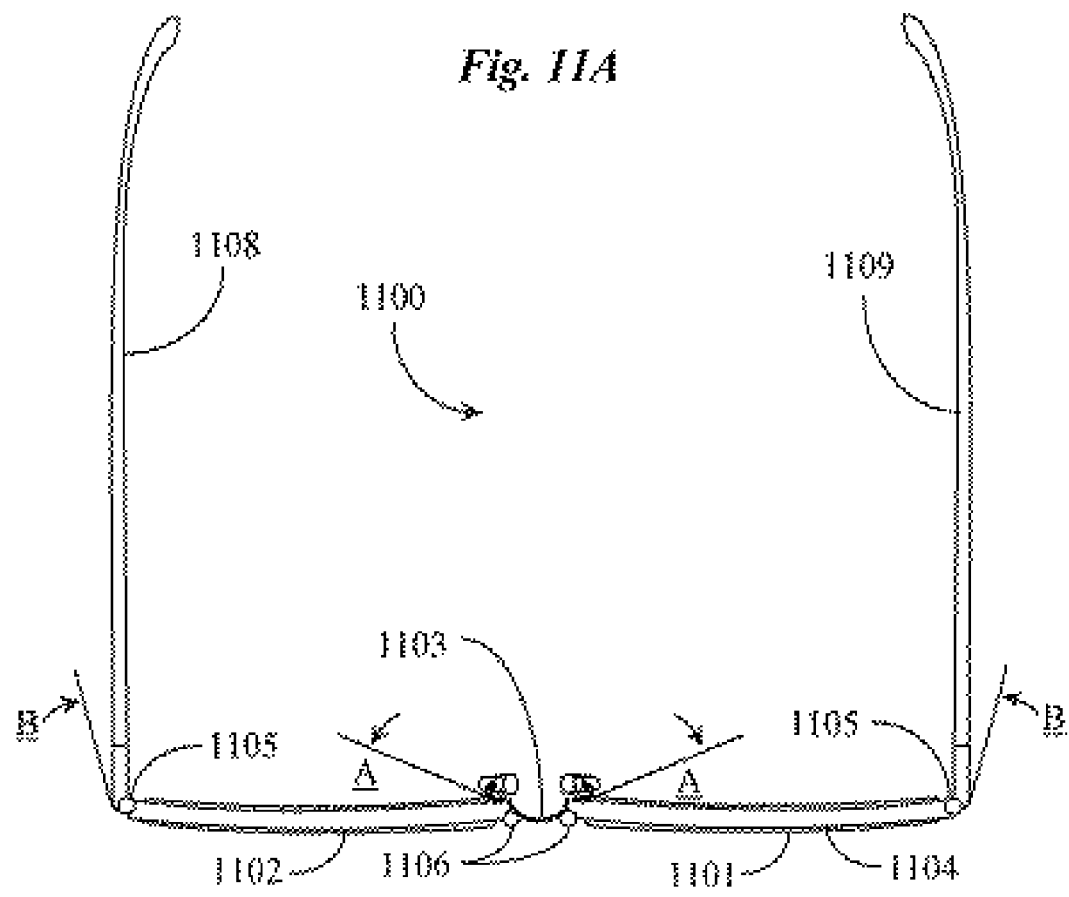
FIG. 11B is a top view of the sunglasses of FIG. 11A illustrating the angles to which hinge-affected components may be adjusted to according to an embodiment of the present invention.

FIG. 11B is a top view of sunglasses 1100 illustrating the angles to which hinge affected components may be adjusted to according to an embodiment of the present invention. Hinges 1106 enable frame 1104 to be angularly disposed along angles A on either side of bridge 1103 while glasses 1100 are being worn by a user. Angle A may vary somewhat in degree, however 30 degrees represents a preferred angle in keeping with the multi-layered and angularly sensitive coatings described further above.

Hinges 1105 disposed at the arms 1108 and 1109 enable the arms to swing past perpendicular to angle B on both sides in a direction away from the user. Angle B may vary somewhat, however 10 to 15 degrees is sufficient for the purpose of the present invention. In use, a user may grasp frame 1104 while wearing glasses 1100 and angularly dispose the frame to assume the position illustrated by angles A. In this action, arms 1108 and 1109 are automatically disposed to assume their new positions illustrated by angles B on either side of the users head. This enables the first angular position while still affording comfort for the user with respect to arms 1108 and 1109 where they fit over the user's ears.

At the angled position of frame 1104 along angles A, lenses 1101 and 1102 exhibit a different color filtering properties than they do in their normal positions. For example, at the new angle, the user sees more greens and yellows and less blues and reds thus sharpening the view (color contrasting) and brightening the view at the same time. This unique capability may be useful, for example while driving on a partly sunny day. During moments of bright sunlight, the user may keep the glasses at normal position wherein the lenses 1101 and 1102 are substantially in a same plane. When cloud-cover blocks out the sun, the user may urge glasses 1100 into an angled position enabling brighter vision at more contrast. Lenses 1102 and 1102 may in one embodiment, be Gamcolor™ multi-layered lenses as described further above.

Figure 12:
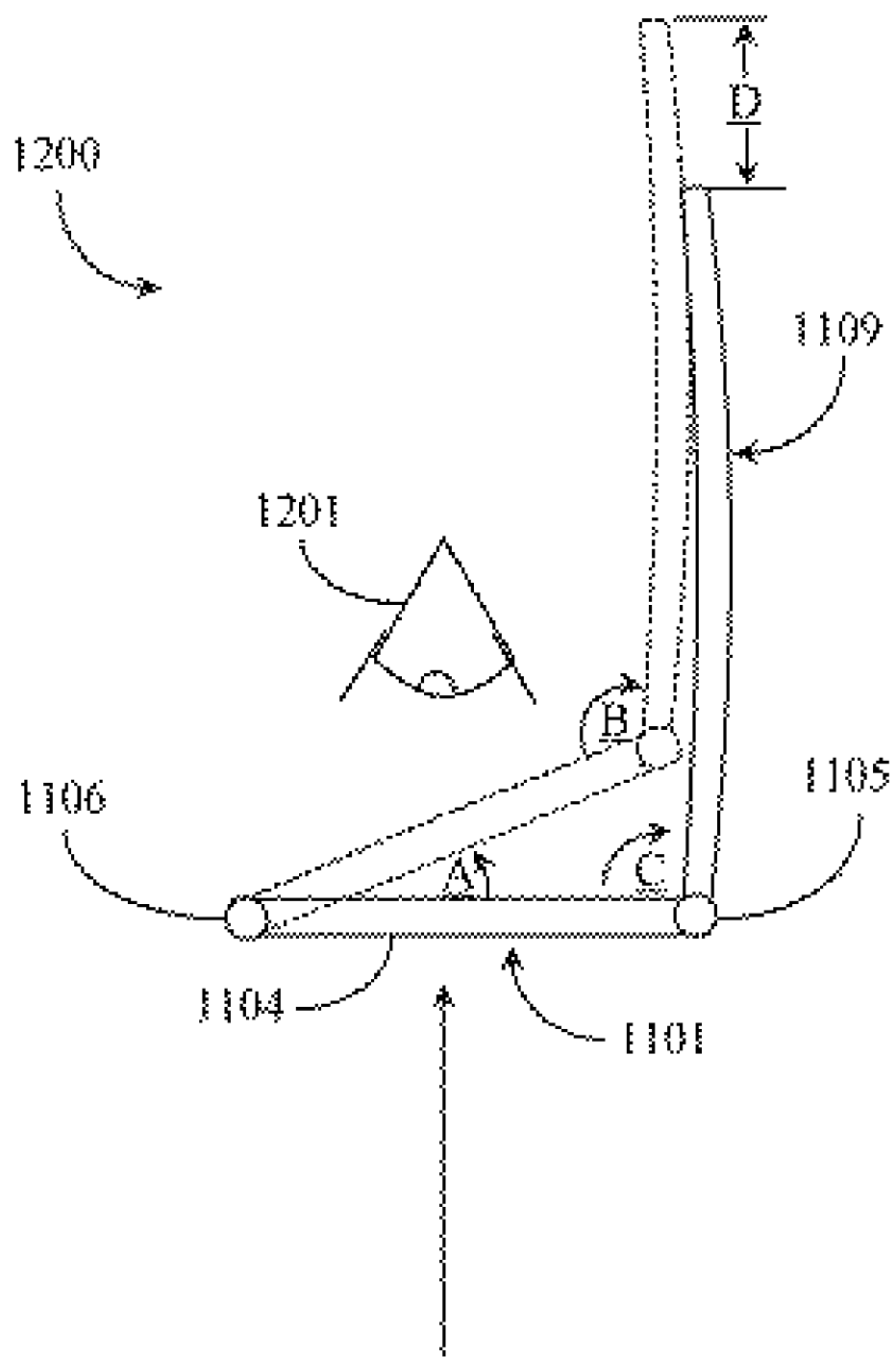
FIG. 12 is a block diagram illustrating the motion of angular disposition of the glasses of FIG. 11B according to an embodiment of the present invention.

FIG. 12 is a bock diagram 1200 illustrating the motion of angular disposition of glasses 1101 according to an embodiment of the present invention. Glasses 1101 are represented herein by one side, which is deemed sufficient to show motion as the opposing side moves in the same manner. In normal position as worn on a user, frame 1104 is at a substantially perpendicular relationship to the line of sight of the user as illustrated herein by a user eye 1201 and the associated directional arrow indicating line of sight direction.

In this position, arm 1109 is substantially perpendicular to frame 1104 at an angle C reflecting a normal angle of wear. Urging frame 1104 backward toward the user causes frame 1104 to be disposed at angle A about hinge 1106. The second position is illustrated herein by a dotted boundary that represents frame 1104 at the new position. The action simultaneously disposed arm 1109 backward for a distance D and to assume angle B in relationship to frame 1104 at the new position. The second arm position is also represented herein by a dotted boundary. At this new angle, the color contrast is remarkably different than in the first position as the line of sight is now at approximately 30 degrees off perpendicular to the horizontal axis plane of frame 1104, hence 30 degrees of perpendicular to the axis plane of the supported multi-layered and angularly sensitive lens 1101.

Referring now back to FIG. 7D, depending on the exact design of the interference multi-layered coating, curve (I) might represent a color transmission through lens 1101 before disposing the lens at an angle. Curve (II) might represent the color transmission through lens 1101 at the proposed 30-degree angle. There are many variable possibilities. The unique hinge arrangement may be adapted to work with a wide variety of eye coverings such as with goggles, safety glasses, helmets, welding shields, and other coverings. Different types of multi-layered and angularly sensitive filters might be provided, for example, to goggles worn under water to improve color contrast and to brighten the image view. In the examples illustrated, the lenses are disposed angularly toward the user in a "V" configuration. That should not be construed as a limitation of the present invention. In other embodiments, lenses may be adapted to rotate slightly within their frames about horizontal or vertical axis similar to the substrates described with respect to mechanisms 816 or 501 described further above. There are many possibilities.

The various embodiments described herein illustrate variable color filtering components used in combination, in some instance, with at least one unique lens arrangement to produce wider and brighter fields of view for Galilean type binocular systems and for enhancing other optical systems such as prism bearing optical systems and even simple eye glasses for selectable color filtering.

It is noted herein that in one embodiment of the invention already described, there is at least one filter which is essentially fixed or otherwise unchanging relative to the color spectrum allowed to pass through it while one or more other filters are caused to pass a changing spectrum by change of angle or position. Relative to this particular exemplary embodiment, the bell shaped response curve of the human eye relative to the visible color spectrum as shown in FIG. 7E is utilized in accordance with the invention to leverage the color contrast of colors viewed by manipulating at least one angle or position-sensitive filter. To further illustrate, the function of the filter described herein as an absorption filter and having no angular sensitivity may in many instances be replaced by a fixed multi-layered interference filter having limited angular sensitivity.

One with skill in the art will clearly visualize upon inspection of the human eye response curve of FIG. 7E, and then comparing it to the response curve of a long wave pass filter, such as the multiplayer interference curve of FIG. 7C that a result is a marked change in color contrast perceived by the human eye. It is further apparent in the embodiment just described that filters passing a fixed color spectrum are utilized in sequence with the movable variable filters to limit the passage of contrast impeding wavelengths, for example blue wavelengths, thus making those wavelengths not limited by the variable filter appear even brighter to the eye. In implementing the invention according to the particular embodiment, long pass wave filters or short pass wave filters may be used.

Therefore the methods and apparatus described herein should be afforded the broadest scope under examination. The present invention may be practiced according to various embodiments described using some of or all of the described components and features without departing from the spirit and scope of the invention. Moreover, other applications involving sight wherein selectable color filtering via tilting or rotating multi-layered angularly sensitive lens elements or treated apparatus are conceivable. For example, mirrors, windows, or other viewing ports may be adapted to practice the present invention. Therefore, the spirit and scope of the present invention shall be limited only by the following claims.

What is claimed is:

1. A binocular optics system having a first and a second barrel arranged with center axes parallel, the second barrel a duplicate of the first barrel, each barrel having an objective end and an ocular end, and comprising:
    a light converging objective lens assembly of two meniscus lenses, each of at least 2.0 inches diameter with a maximum thickness no more than 0.5 inches, the two meniscus lenses in the assembly spaced apart by a gap of no more than 0.5 inches and both arranged convex toward the objective end;
    a light converging field lens positioned in the optical path at least 3.0 inches toward the ocular end from the objective lens assembly, the field lens also a meniscus lens and having a diameter to thickness ratio of about 4:1; and
    a strongly light diverging ocular lens at the ocular end;
    wherein the two barrels are joined in a manner that fixes separation distance of the two axes, such that there is no adjustment for eye separation, and the lenses are fixed in position along the optical axes, such that there is no adjustment for focus.

2. The binocular optics system of claim 1, wherein the meniscus lenses of an objective lens assembly have differing convex radii and differing concave radii, the front lenses in each assembly identical in dimension and the back lenses in each assembly identical in dimension.

3. The binocular optics system of claim 1, further comprising:
    a color absorption filter disposed in a fixed position in front of the light converging objective lens assembly of each barrel.

4. The binocular system of claim 3, further comprising, in each barrel, a color-filtering substrate wherein color transmission characteristics vary with angle of incidence of light with the plane of the substrate, the substrate mounted on an axis rotatable by a user at a position between the objective lens assembly and the field lens, such that the plane of the substrate may be varied relative to the axis direction of the barrel.

5. The binocular optics system of claim 1, further comprising a color absorption filter disposed in a fixed position between the field lens and the ocular lens of each barrel.

6. The binocular optics system of claim 1, further comprising, in each barrel, a substantially planar color-filtering substrate wherein color transmission characteristics vary with angle of incidence of light with the plane of the substrate, the substrate mounted on an axis rotatable by a user at a position between the objective lens assembly and the field lens, such that the plane of the substrate may be varied relative to the axis direction of the barrel.

* * * * *